United States Patent
Shiomi

(10) Patent No.: US 10,083,660 B2
(45) Date of Patent: Sep. 25, 2018

(54) LIQUID-CRYSTAL DISPLAY DEVICE AND LIQUID-CRYSTAL DISPLAY DEVICE CONTROL METHOD

(71) Applicant: Sharp Kabushiki Kaisha, Sakai, Osaka (JP)

(72) Inventor: Makoto Shiomi, Osaka (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 295 days.

(21) Appl. No.: 15/111,187

(22) PCT Filed: Jan. 15, 2015

(86) PCT No.: PCT/JP2015/050945
§ 371 (c)(1),
(2) Date: Jul. 13, 2016

(87) PCT Pub. No.: WO2015/108108
PCT Pub. Date: Jul. 23, 2015

(65) Prior Publication Data
US 2016/0335960 A1    Nov. 17, 2016

(30) Foreign Application Priority Data
Jan. 16, 2014    (JP) ................................ 2014-006146

(51) Int. Cl.
*G09G 3/34* (2006.01)
*G09G 3/36* (2006.01)
*G02F 1/1335* (2006.01)

(52) U.S. Cl.
CPC ........... *G09G 3/3413* (2013.01); *G09G 3/342* (2013.01); *G09G 3/36* (2013.01); *G09G 3/3611* (2013.01);
(Continued)

(58) Field of Classification Search
CPC ... G02F 1/133621; G02F 2001/133601; G02F 2001/133614; G02F 2001/133624;
(Continued)

(56) References Cited

U.S. PATENT DOCUMENTS

2010/0079366 A1* 4/2010 Lin ..................... G09G 3/3413
345/102
2012/0281025 A1* 11/2012 Hanamoto ........... G09G 3/3413
345/690

(Continued)

FOREIGN PATENT DOCUMENTS

JP    2004139876 A    5/2004
JP    2007147956 A    6/2007

OTHER PUBLICATIONS

International Search Report PCT/ISA/210 for International Application No. PCT/JP2015/050945 dated Feb. 24, 2015.

*Primary Examiner* — Viet Pham
(74) *Attorney, Agent, or Firm* — ScienBiziP, P.C.

(57) ABSTRACT

A liquid-crystal display device includes red pixels with red color filters, green pixels with green filters, blue pixels with blue filters, and a light projecting unit to project light upon the pixels. The light projecting unit includes first and second light sources wherein the light emission peak wavelength is in the green region, and a third light source wherein the light emission peak wavelength is in the blue region. The second light source includes a light emission peak wavelength greater than the first light source. In a first term, the first source emits light, and the blue pixel liquid-crystal layer is controlled to a transmissibility less than or equal to a threshold regardless of frame data. In a second term, the first light source is effectively not and the second and third sources are emitting light. The blue pixel liquid-crystal layer is controlled to a transmissibility according to frame data.

13 Claims, 25 Drawing Sheets

(52) U.S. Cl.
CPC .................. *G02F 1/133621* (2013.01); *G02F 2001/133601* (2013.01); *G02F 2001/133614* (2013.01); *G02F 2001/133624* (2013.01); *G09G 2300/0452* (2013.01); *G09G 2310/0235* (2013.01); *G09G 2310/0237* (2013.01); *G09G 2320/0242* (2013.01); *G09G 2320/0247* (2013.01); *G09G 2320/0646* (2013.01); *G09G 2330/021* (2013.01)

(58) Field of Classification Search
CPC ... G09G 2300/0452; G09G 2310/0235; G09G 2310/0237; G09G 2320/0242; G09G 2320/0247; G09G 2320/0646; G09G 2330/021; G09G 3/3413; G09G 3/342; G09G 3/36
See application file for complete search history.

(56) References Cited

U.S. PATENT DOCUMENTS

| | | | |
|---|---|---|---|
| 2014/0078716 A1* | 3/2014 | Ninan | F21V 9/40 362/84 |
| 2014/0268633 A1* | 9/2014 | Kwon | G09G 3/2025 362/84 |
| 2014/0268634 A1* | 9/2014 | Kang | G09G 3/2025 362/84 |

* cited by examiner

US 10,083,660 B2

LIQUID-CRYSTAL DISPLAY DEVICE AND LIQUID-CRYSTAL DISPLAY DEVICE CONTROL METHOD

TECHNICAL FIELD

The present invention relates to a liquid-crystal display device.

BACKGROUND ART

In a liquid-crystal display device, a color filter used for red pixels, a color filter used for green pixels, and a color filter used for blue pixels generally have characteristics as illustrated in FIG. 24, and the color filter used for blue pixels transmit light of a wavelength of around 530 nm (light in a green region) greatly. Thus, a liquid-crystal display device using a green light source of 530 nm in light emission peak wavelength (wavelength at a peak of light emission intensity in spectrum characteristic indicating wavelength dependency of light emission intensity) has, for example, a chromaticity diagram indicated with Y of FIG. 25, and a liquid-crystal display device using a green light source of 550 nm in light emission peak wavelength has, for example, a chromaticity diagram indicated with Z of FIG. 25. Note that, the characteristic of the color filters illustrated in FIG. 24 are modeled for convenience of description.

CITATION LIST

Patent Literature

PTL 1: Japanese Unexamined Patent Application Publication No. 2004-139876
PTL 2: Japanese Unexamined Patent Application Publication No. 2007-147956

SUMMARY OF INVENTION

Technical Problem

The liquid-crystal display device indicated by the display chromaticity diagram Y of FIG. 25 has a high purity of green and a low purity of blue, and the liquid-crystal display device indicated by the display chromaticity diagram Z of FIG. 25 has a high purity of blue and a low purity of green. The purities of both blue and green are difficult to be achieved even by combining the green light source of 530 nm in light emission peak wavelength and the green light source of 550 nm in light emission peak wavelength.

The invention aims to improve color reproducibility of a liquid-crystal display device.

Solution to Problem

The present liquid-crystal display device is a liquid-crystal display device which includes a red pixel including a red color filter, a green pixel including a green color filter, a blue pixel including a blue color filter, and a light radiation unit for radiating light to each of the pixels, the light radiation unit having first and second light sources each having a light emission peak wavelength in a green region and a third light source having a light emission peak wavelength in a blue region, in which the light emission peak wavelength of the second light source is greater than the light emission peak wavelength of the first light source, first and second terms are provided, and the first light source emits light and a liquid-crystal layer of the blue pixel is controlled to have a low transmittance equal to or less than a threshold regardless of frame data in the first term, and the first light source substantially does not emit light, the second and third light sources emit light, and the liquid-crystal layer of the blue pixel is controlled to have a transmittance according to frame data in the second term.

Advantageous Effects of Invention

With the present liquid-crystal display device, it is possible to improve color reproducibility.

DESCRIPTION OF EMBODIMENTS

Figure 1:
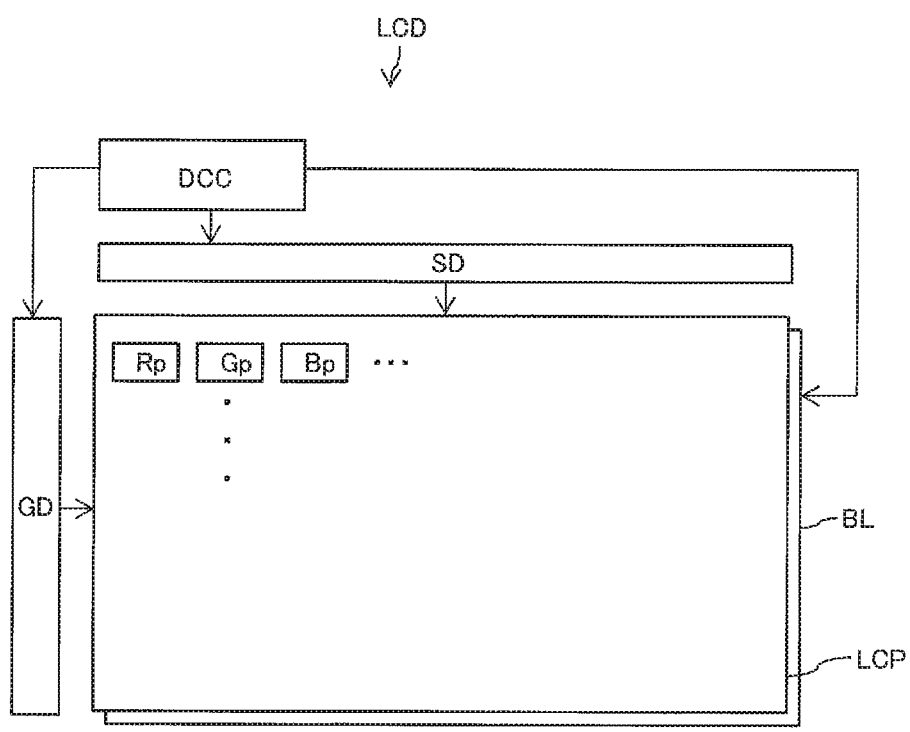
FIG. 1 is a block diagram illustrating a configuration of a liquid-crystal display device according to the present embodiment.

FIG. 1 is a block diagram illustrating a configuration of a liquid-crystal display device according to the present embodiment. As illustrated in the same figure, a liquid-crystal display device LCD includes a display control circuit DCC, a gate driver GD, a source driver SD, a liquid-crystal panel LCP including red pixels Rp, green pixels Gp, and blue pixels Bp, and a backlight BL. A size (the number of pixels) of the liquid-crystal panel is not limited, but is preferably large, in particular, such as a 2K1K (about 2000 pixels in width and 1000 pixels in height) size corresponding to current high definition television broadcast (high definition) to an 8K4K (about 8000 pixels in width and 4000 pixels in height) size corresponding to super high definition broadcast (so-called super high definition).

Each pixel (Rp, Gp, Bp) of the liquid-crystal panel LCP includes a liquid-crystal layer, one or more pixel electrodes, and a color filter (red, green, blue), and each of the pixel electrode is connected to a data signal line and a scanning signal line through a transistor. The gate driver GD drives the scanning signal line and the source driver SD drives the data signal line (supplies potential). The backlight BL which supplies light to each pixel (Rp, Gp, Bp) is provided with first and second light sources, each of which has a light emission peak wavelength in a green region, a third light source which has a light emission peak wavelength in a blue region, and a fourth light source which has a light emission peak wavelength in a red region, and the light emission peak wavelength of the second light source is greater than the light emission peak wavelength of the first light source.

The display control circuit DCC has first and second terms, and is able to control the gate driver GD, the source driver SD, and the backlight BL so that the first light source emits light and the liquid-crystal layer of the blue pixel Bp is adjusted to have a low transmittance equal to or less than a threshold regardless of frame data in the first term, and the first light source does not emit light substantially and the second and third light sources emit light and the liquid-crystal layer of the blue pixel Bp is adjusted to have a transmittance according to frame data in the second term.

EXAMPLE 1

Figure 2:
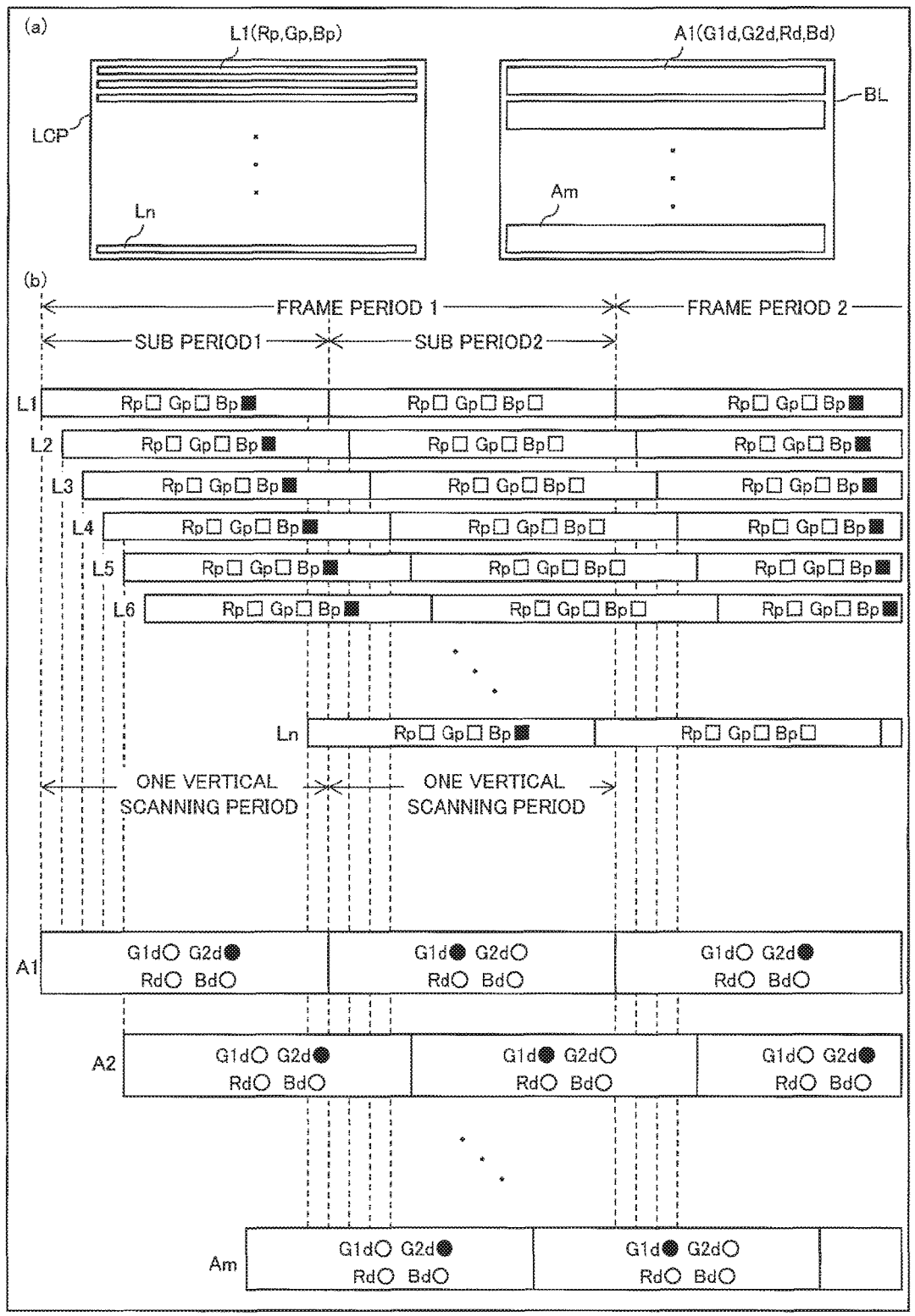
FIG. 2(a) is a block diagram illustrating a configuration of a liquid-crystal display device of Example 1 and (b) is a timing chart illustrating operations of the liquid-crystal display device of Example 1.

FIG. 2(a) illustrates a configuration of a liquid-crystal display device of Example 1, and FIG. 2(b) illustrates operations of the liquid-crystal display device of Example 1. In Example 1, the liquid-crystal panel LCD has pixel lines L1 to Ln parallel to a direction in which the scanning signal line extends. The first pixel line L1 includes a red pixel Rp, a green pixel Gp, and a blue pixel Bp, and the pixel lines L1 to Ln are sequentially scanned in one vertical scanning period.

As for a frame period 1 of the pixel line L1, the frame period 1 includes a sub period 1 and a sub period 2, and the red pixel Rp, the green pixel Gp, and the blue pixel Bp in the first pixel line L1 are simultaneously updated at the beginning of the sub period 1 (first time) and the red pixel Rp, the green pixel Gp, and the blue pixel Bp in the first pixel line L1 are simultaneously updated at the beginning of the sub period 2 (second time). Each length of the sub period 1 and the sub period 2 is equal to a length of one vertical scanning period.

In Example 1, the backlight BL has divisional illumination areas A1 to Am parallel to a direction in which the scanning signal line extends. Each of the divisional illumination areas includes a first light source G1d (light emission peak wavelength: 520 nm), a second light source G2d (light emission peak wavelength: 550 nm), a third light source Bd (light emission peak wavelength: blue region), and a fourth light source Rd (light emission peak wavelength: red region), each of which is formed by an LED (light emission diode) chip, and these divisional illumination areas A1 to Am are sequentially scanned in one vertical scanning period.

Specifically, turning-on of the first light source G1d (non-light emission ● to light emission ○ in the figure) and turning-off of the second light source G2d in synchronization therewith (light emission ○ to non-light emission ● in the figure) are sequentially performed for each of the divisional illumination areas A1 to Am (in one vertical scanning period), and then, turning-off of the first light source G1d (light emission ○ to non-light emission ● in the figure) and turning-on of the second light source G2d in synchronization therewith (non-light emission ● to light emission ○ in the figure) are sequentially performed for each of the divisional illumination areas A1 to Am (in next one vertical scanning period). The third light source Bd and the fourth light source Rd emit light at all times (○ in the figure) and do not flash.

In the divisional illumination area A1 of the sub period 1 (the divisional illumination area corresponding to the pixel line L1), the second light source G2d does not emit light (● in the figure) and the first light source G1d, the third light source Bd, and the fourth light source Rd emit light (○ in the figure). For each of the pixels of the pixel line L1 in the sub period 1, the pixel electrode of the blue pixel Bp is adjusted to have a potential near a black level regardless of frame data (solid square ■ in the figure) and the pixel electrodes of the red pixel Rp and the green pixel Gp are adjusted to have potentials according to frame data (blank square ☐ in the figure).

In the divisional illumination area A1 of the sub period 2, the first light source G1d does not emit light (● in the figure) and the second light source G2d, the third light source Bd, and the fourth light source Rd emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square ☐ in the figure).

Thus, in a period in which a liquid-crystal response of each of the pixels reaches a predetermined level in the sub period 1 (first term), the second light source G2d does not emit light and the first light source G1d emits light, and the liquid-crystal layer of the blue pixel Bp is adjusted to have a transmittance near a black level regardless of frame data and the liquid-crystal layer of the green pixel Gp is adjusted to have a transmittance according to frame data, so that it is possible to block light of the first light source G1d by the blue pixel Bp while irradiating the green pixel Gp with the light from the first light source G1d (green having a high purity). On the other hand, in a period in which a liquid-crystal response of each of the pixels reaches a predetermined level in the sub period 2 (second term), the first light source G1d does not emit light and the second light source G2d and the third light source Bd emit light, and the liquid-crystal layers of the green pixel Gp and the blue pixel Bp are adjusted to have transmittances according to frame data, so that the green pixel Gp is irradiated with light from the second light source G2d and the blue pixel Bp is irradiated with light from the third light source Bd, while light of green on the short wavelength side (green having a high purity) is not irradiated to the blue pixel Bp.

Figure 3:
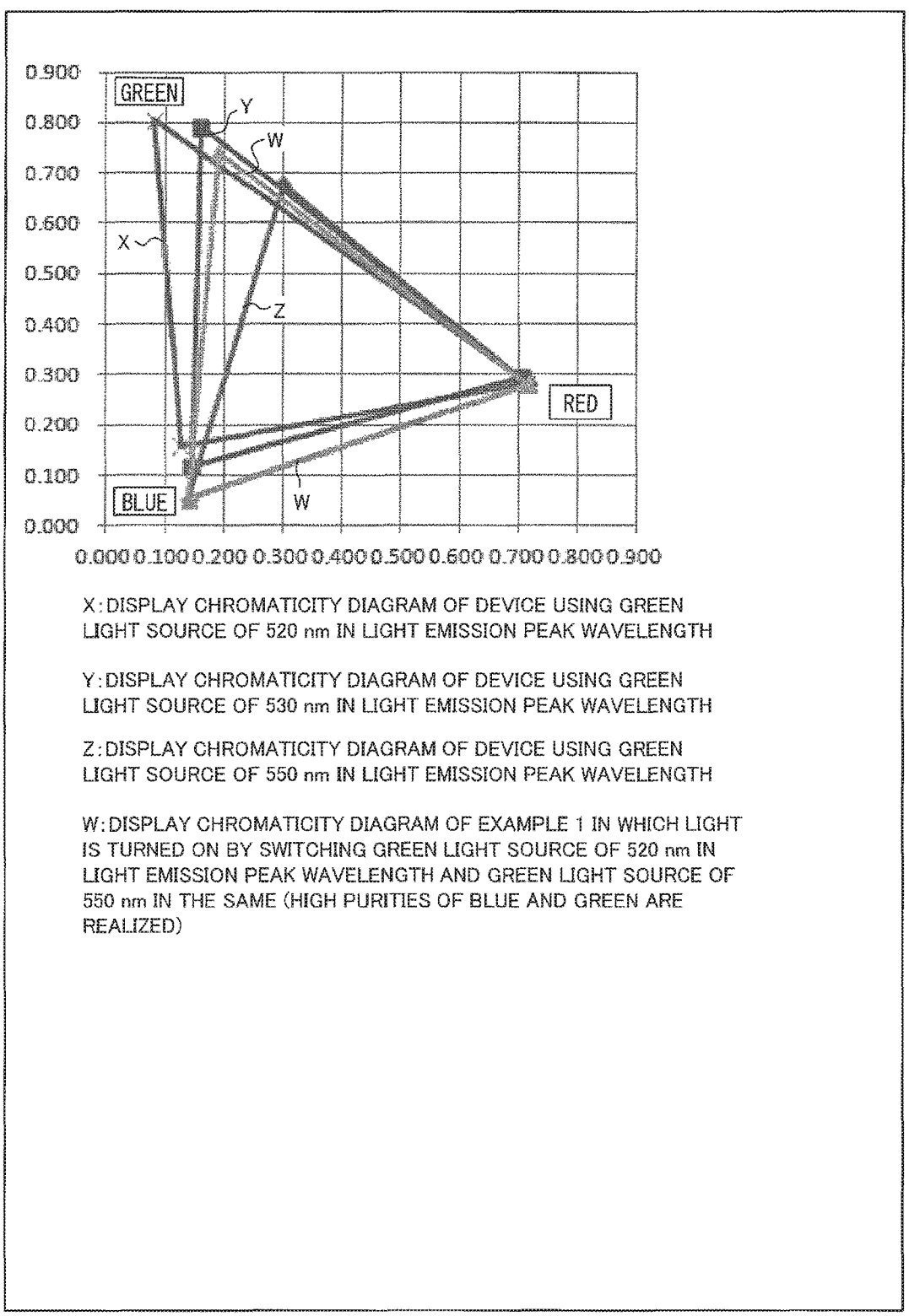
FIG. 3 is a display chromaticity diagram for explaining an effect of Example 1.

This makes it possible to prevent intermixing of colors in the blue pixel while using the first light source G1d which outputs light of green having a high purity (peak wavelength: 520 nm) (increase the purity of green while ensuring the purity of blue) and to improve color reproducibility. W in FIG. 3 indicates a display chromaticity diagram of the liquid-crystal display device LCD of Example 1. It is found from FIG. 3 that the purity of blue is high similarly to that of Z and the purity of green is also high (for example, a purity near 535 nm required in super high definition standard).

The purity (wavelength) of green displayed in the liquid-crystal display device LCD is a color (wavelength) obtained by mixing of green light by the first light source G1d and green light by the second light source G2d, that is, between 520 nm and 550 nm. In general, when a color tone of green is adjusted, a color filter and a light source of green are redesigned or a red color or a blue color is mixed even if knowing that the color purity is lowered, but adjustment is able to be performed without impairing the color purity between the peak wavelengths of the first and second light sources G1d and G2d in Example 1.

Note that, in order to realize the green color of a desired wavelength (for example, 535 nm), (1) the transmittance of the liquid crystal layer of the green pixel Gp in the sub period 1 and the sub period 2 may be adjusted (to be the same or different), (2) a luminance ratio of the first and second light sources G1d and G2d may be optimized, or (3) both of them may be performed. For convenience of intended use and production or according to a cost or the like, (1) to (3) may be selected.

In Example 1, since the green pixel Gp is adjusted to have the transmittance according to frame data at all times during the frame period and receives the light from the first light source G1d (peak wavelength: 520 nm) or the light from the second light source G2d (peak wavelength: 550 nm), luminance of the green pixel Gp, which has an extremely large effect on display luminance, is ensured and flicker of a screen is hard to be recognized compared to a general field sequential method.

In Example 1, since the fourth light source Rd emits light at all times and the red pixel Rp is also adjusted to have the transmittance according to frame data at all times during the frame period, efficiency of red light is high and control for the fourth light source Rd is easily performed.

Figure 4:
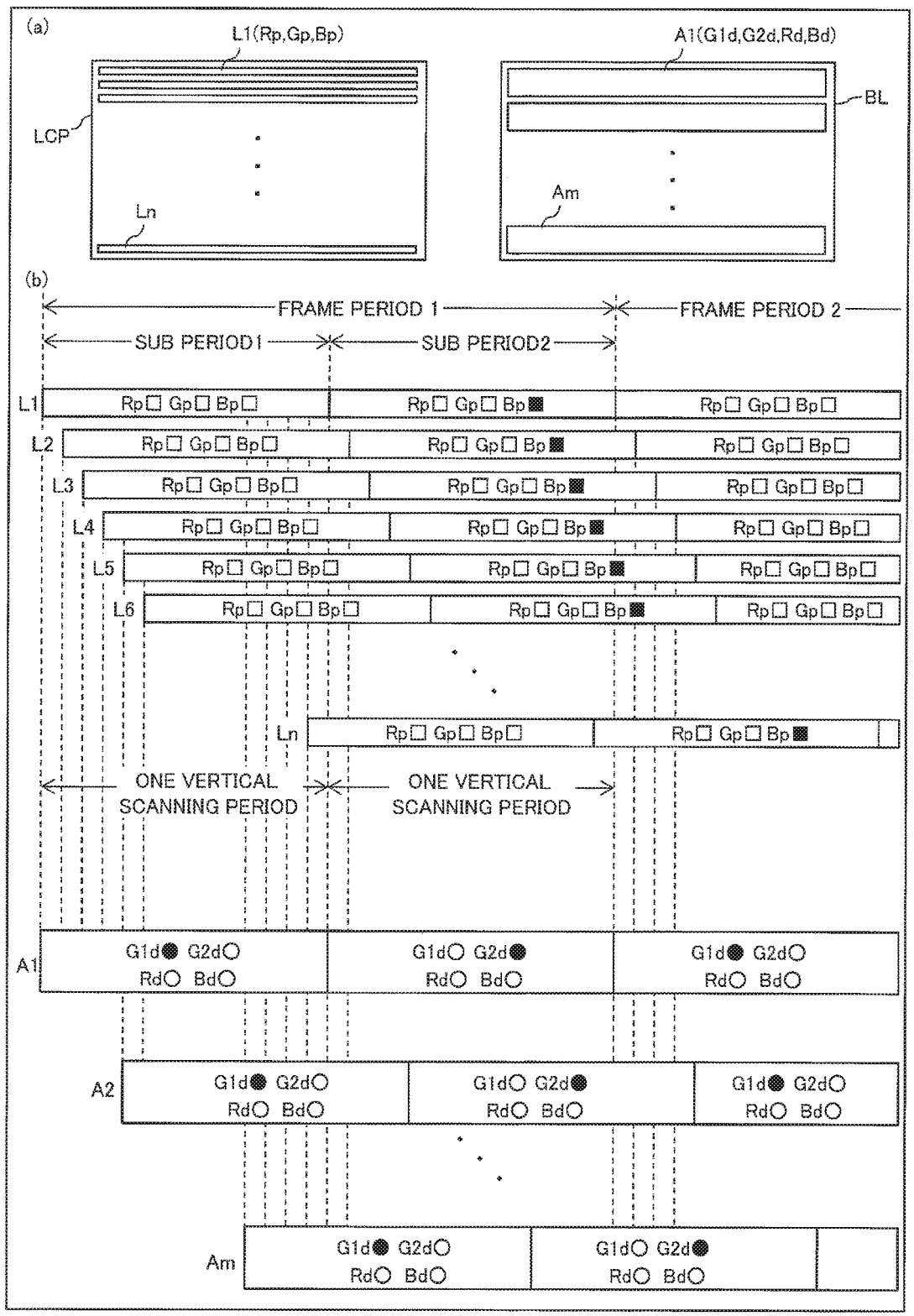
FIG. 4(a) is a block diagram illustrating a modified example of the liquid-crystal display device of Example 1 and (b) is a timing chart illustrating operations of the liquid-crystal display device of Example 1.

Though the transmittance of the blue pixel Bp is set to be near a black level in the sub period 1 and the blue pixel is adjusted to have the transmittance according to frame data in the sub period 2 subsequent to the sub period 1 in Example, 1, there is no limitation thereto. As illustrated in FIG. 4, of course, a configuration in which the second light source G2d is caused to emit light by adjusting the blue pixel to have the transmittance according to frame data in the sub period 1 and the first light source G1d is caused to emit light by adjusting the blue pixel Bp to have the transmittance near a black level in the sub period 2 subsequent to the sub period 1 is also possible.

Figure 5:
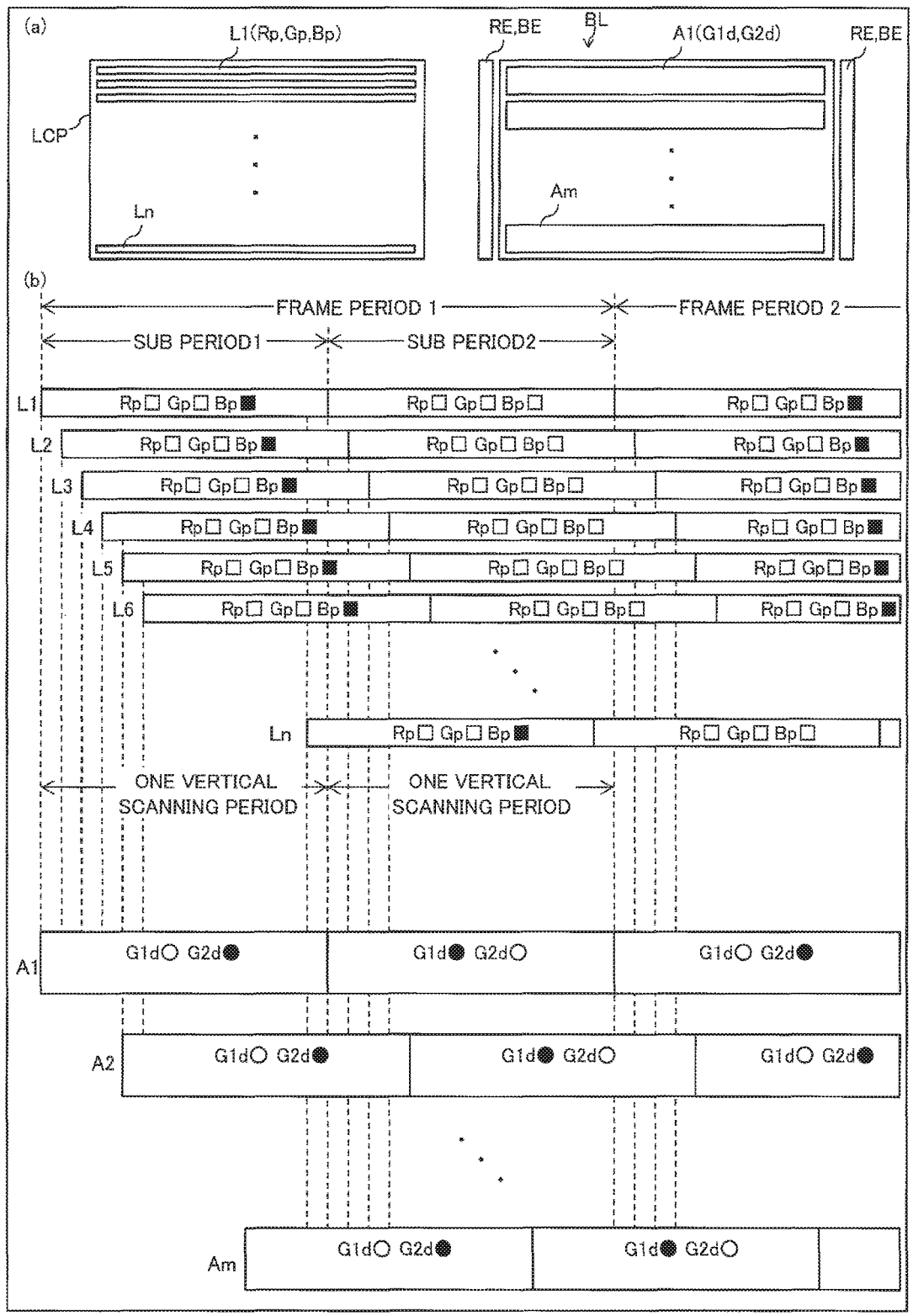
FIG. 5(a) is a block diagram illustrating a modified example of the liquid-crystal display device of Example 1 and (b) is a timing chart illustrating operations of the liquid-crystal display device of Example 1.

Each divisional illumination area of Embodiment 1 includes the first to fourth light sources (G1d, G2d, Bd, and Rd) each of which is formed by an LED (light emission diode) chip, but there is no limitation thereto. As illustrated in FIG. 5, an edge light type in which only the first and second light sources (G1d and G2d), each of which is formed by an LED (light emission diode) chip, are provided in each divisional illumination area directly below the liquid-crystal panel and the third and fourth light sources (BE and RE) are arranged below edges (both sides) of the liquid-crystal panel is also allowed. In this case, LED, a laser, a Cold Cathode Fluorescent Lamp (CCFL), or the like is used for the third and fourth light sources (BE and RE) and the light thereof is irradiated to the liquid-crystal panel LCP by a light guide plate or the like.

EXAMPLE 2

FIG. 6(a) illustrates a configuration of a liquid-crystal display device of Example 2, and FIG. 6(b) illustrates operations of the liquid-crystal display device of Example 2. The third light source Bd emits light at all times (does not flash) in Example 1, but there is no limitation thereto. As illustrated in FIG. 5, the third light source Bd may flash according to control of the blue pixel.

As for the frame period 1 of the pixel line L1, the frame period 1 includes the sub period 1 and the sub period 2, and the red pixel Rp, the green pixel Gp, and the blue pixel Bp in the first pixel line L1 are simultaneously updated at the beginning of the sub period 1 (first time) and the red pixel Rp, the green pixel Gp, and the blue pixel Bp in the first pixel line L1 are simultaneously updated at the beginning of the sub period 2 (second time). Each length of the sub period 1 and the sub period 2 is equal to a length of one vertical scanning period.

In the backlight BL, turning-on of the first light source G1d (non-light emission ● to light emission ○ in the figure) and turning-off of the second light source G2d and the third light source Bd in synchronization therewith (light emission ○ to non-light emission ● in the figure) are sequentially performed for each of the divisional illumination areas A1 to Am (in one vertical scanning period), and then, turning-off of the first light source G1d (light emission ○ to non-light emission ● in the figure) and turning-on of the second light source G2d and the third light source Bd in synchronization therewith (non-light emission ● to light emission ○ in the figure) are sequentially performed for each of the divisional illumination areas A1 to Am (in next one vertical scanning period). The fourth light source Rd emits light at all times (○ in the figure) and does not flash.

In the divisional illumination area A1 of the sub period 1, the second light source G2d and the third light source Bd do not emit light (● in the figure) and the first light source G1d and the fourth light source Rd emit light (○ in the figure). For each of the pixels of the pixel line L1 in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 2, the first light source G1d does not emit light (● in the figure) and the second light source G2d, the third light source Bd, and the fourth light source Rd emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square □ in the figure).

In Example 2, the effect described in Example 1 is able to be achieved in the first term included in the sub frame 1 and the second term included in the sub period 2. Further, since the third light source Bd does not emit light in the sub period 1 in which the pixel electrode of the blue pixel Bp is adjusted to have a potential near a black level, it is possible to suppress power consumption of the third light source Bd and also possible to suppress intermixing of colors (transmission of the green pixel and the red pixel of blue light).

EXAMPLE 3

Figure 6:
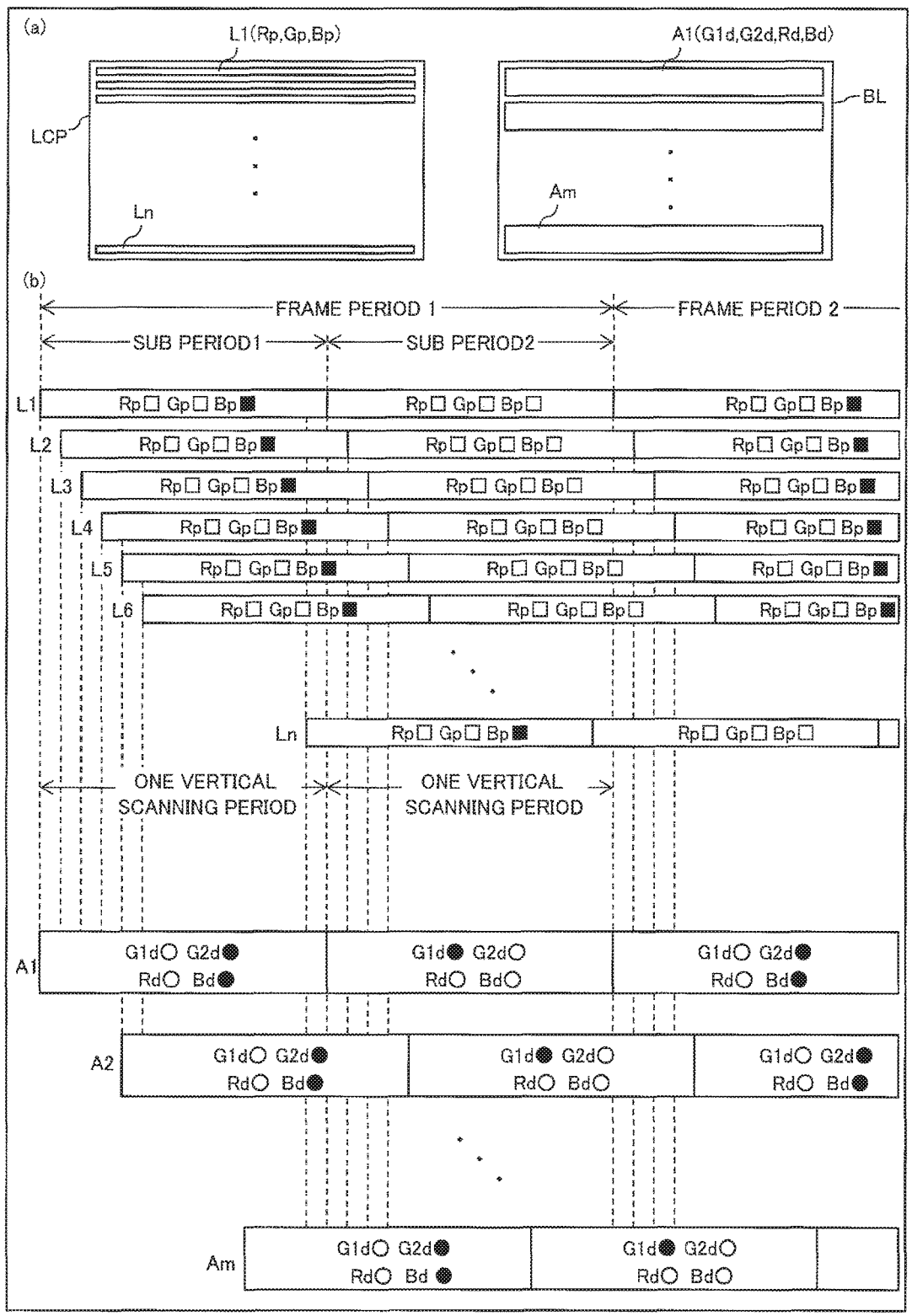
FIG. 6(a) is a block diagram illustrating a configuration of a liquid-crystal display device of Example 2 and (b) is a timing chart illustrating operations of the liquid-crystal display device of Example 2.
Figure 7:
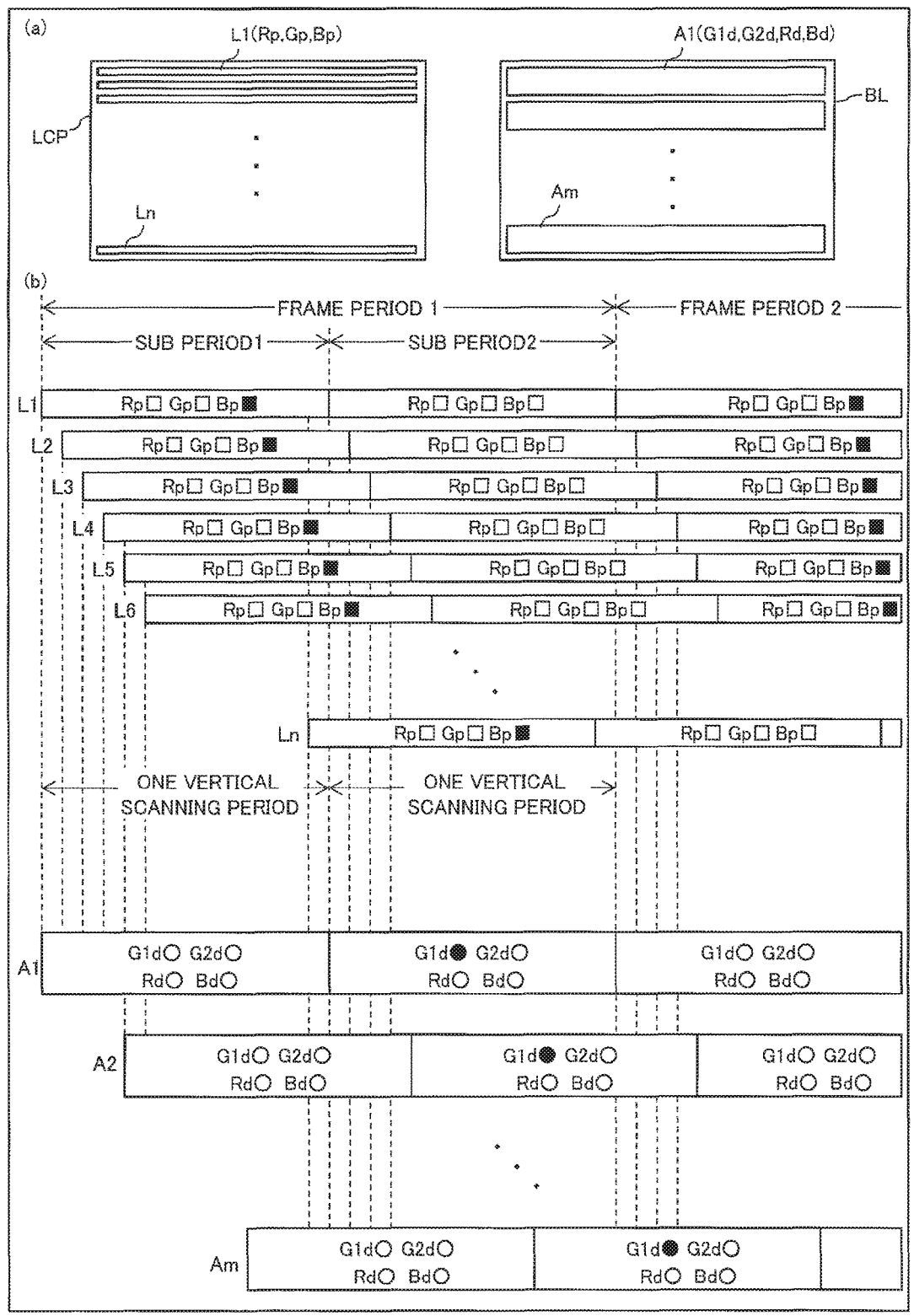
FIG. 7(a) is a block diagram illustrating a configuration of a liquid-crystal display device of Example 3 and (b) is a timing chart illustrating operations of the liquid-crystal display device of Example 3.

FIG. 7(a) illustrates a configuration of a liquid-crystal display device of Example 3, and FIG. 7(b) illustrates operations of the liquid-crystal display device of Example 3. The second light source G2d flashes in Example 1, but there is no limitation thereto. As illustrated in FIG. 6, the second light source G2d may be lit at all times and only the first light source G1d may flash.

As for the frame period 1 of the pixel line L1, the frame period 1 includes the sub period 1 and the sub period 2, the red pixel Rp, the green pixel Gp, and the blue pixel Bp in the first pixel line L1 are simultaneously updated at the beginning of the sub period 1 (first time), and the red pixel Rp, the green pixel Gp, and the blue pixel Bp in the first pixel line L1 are simultaneously updated at the beginning of the sub period 2 (second time). Each length of the sub period 1 and the sub period 2 is equal to a length of one vertical scanning period.

In the backlight BL, turning-on of the first light source G1d (non-light emission ● to light emission ○ in the figure) is sequentially performed for each of the divisional illumination areas A1 to Am (in one vertical scanning period), and then, turning-off of the first light source G1d (light emission ○ to non-light emission ● in the figure) is sequentially performed for each of the divisional illumination areas A1 to Am (in next one vertical scanning period). The second light source to the fourth light source (G2d, Bd, and Rd) emit light at all times (○ in the figure) and do not flash.

In the divisional illumination area A1 of the sub period 1, all the light sources (G1d, G2d, Bd, and Rd) emit light (○ in the figure). For each of the pixels of the pixel line L1 in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 2, the first light source G1d does not emit light (● in the figure) and the second light source to the fourth light source (G2d, Bd, and Rd) emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square □ in the figure).

In Example 3, the effect described in Example 1 is able to be achieved in the first term included in the sub frame 1 and the second term included in the sub period 2. Further, since the second light source G2d is lit at all times, display luminance is enhanced and control for the second light source G2d is also easily performed. Note that, while the wavelength of green (pure color) is able to be adjusted to be, for example, at an intermediate between the peak wavelength of the first light source G1d and the peak wavelength of the second light source G2d in Example 1, the wavelength of green (pure color) is able to be adjusted to be, for example, at an intermediate between the peak wavelength of mixed light of the first and second light sources and the peak wavelength of the second light source in Example 3. An adjustable range is greater in Example 1, but when different transmittances of the green pixel Gp are used between the sub periods 1 and 2 by using the same liquid-crystal panel, the adjustment is able to be performed more accurately in Example 3. For convenience of intended use and production or according to a cost or the like, Examples may be selected.

EXAMPLE 4

Figure 8:
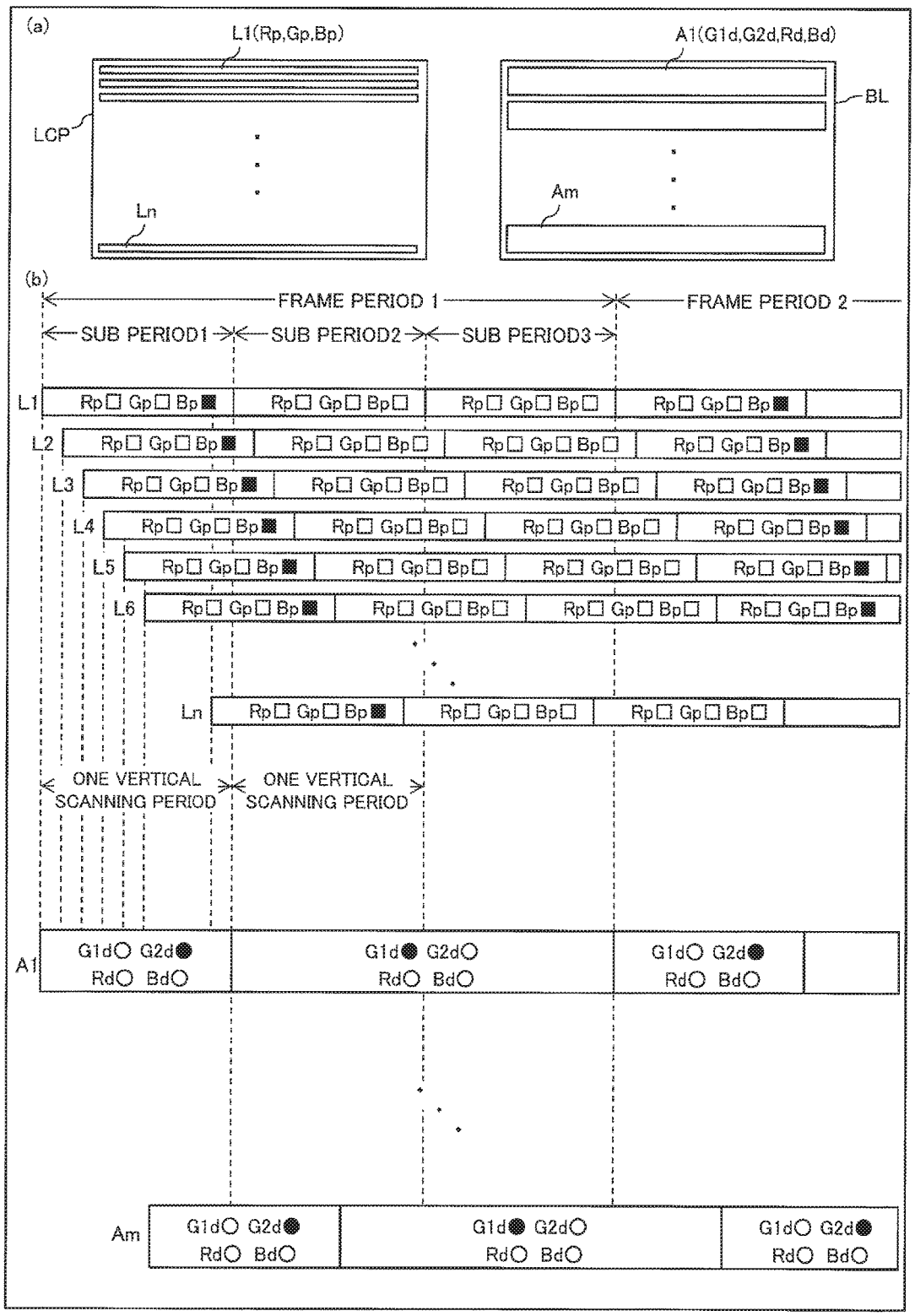
FIG. 8(a) is a block diagram illustrating a configuration of a liquid-crystal display device of Example 4 and (b) is a timing chart illustrating operations of the liquid-crystal display device of Example 4.

FIG. 8(a) illustrates a configuration of a liquid-crystal display device of Example 4, and FIG. 8(b) illustrates operations of the liquid-crystal display device of Example 4. As illustrated in FIG. 8, it may be configured so that the frame period 1 includes sub periods 1 to 3.

As for the frame period 1 of the pixel line L1, the red pixel Rp, the green pixel Gp, and the blue pixel Bp in the first pixel line L1 are simultaneously updated at the beginning of the sub period 1 (first time), the red pixel Rp, the green pixel Gp, and the blue pixel Bp in the first pixel line L1 are simultaneously updated at the beginning of the sub period 2, and the red pixel Rp, the green pixel Gp, and the blue pixel Bp in the first pixel line L1 are simultaneously updated at the beginning of the sub period 3 (third time). Each length of the sub periods 1 to 3 is equal to a length of one vertical scanning period.

In the backlight BL, turning-on of the first light source G1d (non-light emission ● to light emission ○ in the figure) and turning-off of the second light source G2d in synchronization therewith (light emission ○ to non-light emission ● in the figure) are sequentially performed for each of the divisional illumination areas A1 to Am (in one vertical scanning period), and then, turning-off of the first light source G1d (light emission ○ to non-light emission ● in the figure) and turning-on of the second light source G2d in synchronization therewith (non-light emission ● to light emission ○ in the figure) are sequentially performed for each of the divisional illumination areas A1 to Am (in next one vertical scanning period), but there is no change in the states (light emission/non-light emission) of the respective light sources (G1d, G2d, Bd, and Rd) in a further next one vertical scanning period.

In the divisional illumination area A1 of the sub period 1 (the divisional illumination area corresponding to the pixel line L1), the second light source G2d does not emit light (● in the figure) and the first light source G1d, the third light source Bd, and the fourth light source Rd emit light (○ in the figure). For each of the pixels of the pixel line L1 in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 2, the first light source G1d does not emit light (● in the figure) and the second light source G2d, the third light source Bd, and the fourth light source Rd emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square □ in the figure).

In the divisional illumination area A1 of the sub period 3, the first light source G1d does not emit light (● in the figure) and the second light source G2d, the third light source Bd, and the fourth light source Rd emit light (○ in the figure). For each of the pixels of the pixel line L1 in the sub period 3, the pixel electrodes of the red pixel Rp, the green pixel Gp, and the blue pixel Bp are adjusted to have potentials according to frame data (blank square □ in the figure).

According to Example 4, the effect described in Example 1 is able to be achieved in the first term included in the sub frame 1 and the second term included in the sub periods 2 and 3. Further, color adjustment is able to be performed without changing a luminance ratio of the first and second light sources G1d and G2d. Note that, by adjusting the transmittances of the respective pixels of the green pixel GP, the blue pixel Bp, and the red pixel Rp between the sub periods 2 and 3 and setting average luminance of the sub period 3 to be equal to or less than average luminance of the sub period 2, it is also possible to achieve improvement in moving image response performance.

EXAMPLE 5

Figure 9:
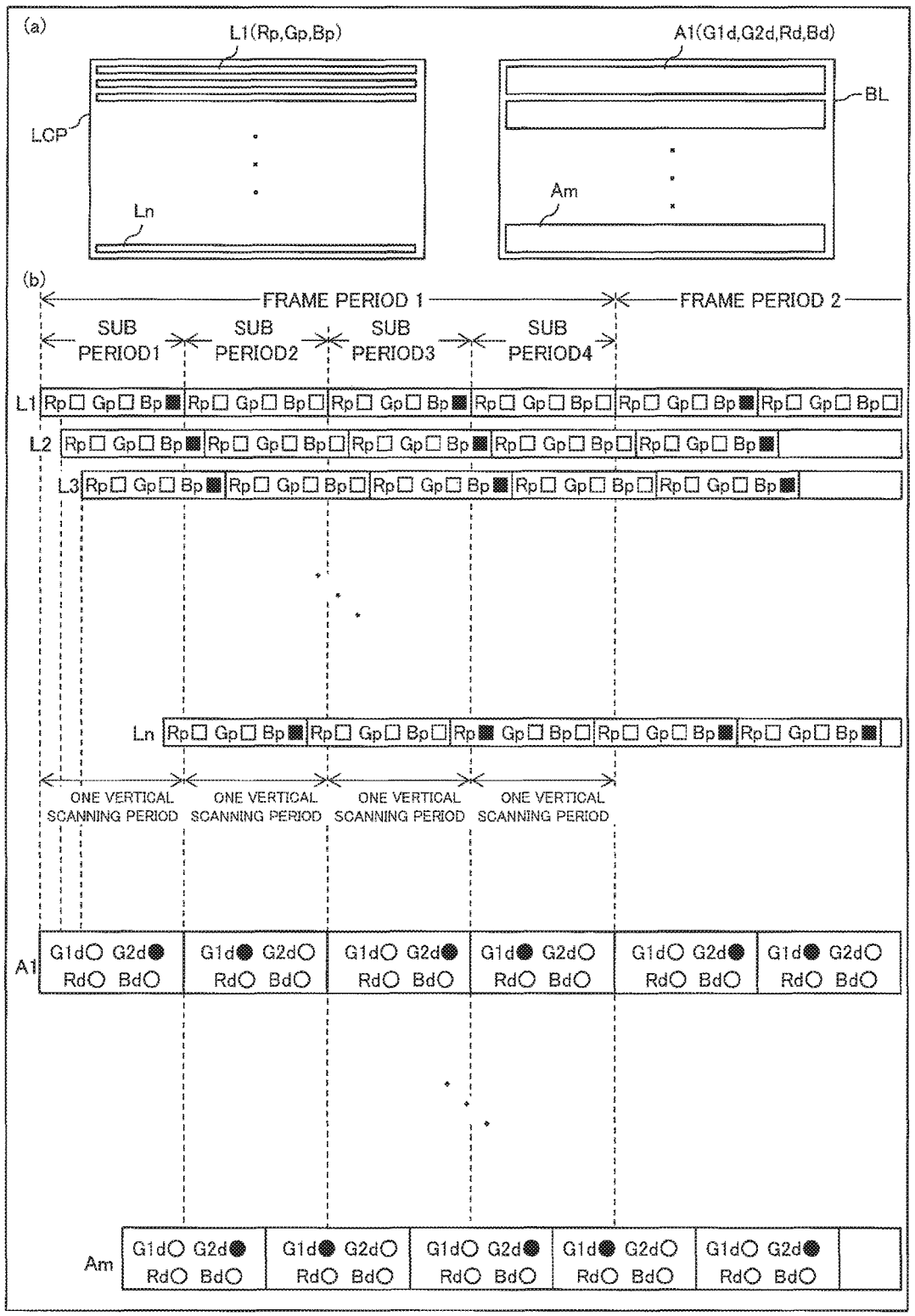
FIG. 9(a) is a block diagram illustrating a configuration of a liquid-crystal display device of Example 5 and (b) is a timing chart illustrating operations of the liquid-crystal display device of Example 5.

FIG. 9(a) illustrates a configuration of a liquid-crystal display device of Example 5, and FIG. 9(b) illustrates operations of the liquid-crystal display device of Example 5. As illustrated in FIG. 9, it may be configured so that the frame period 1 includes sub periods 1 to 4.

As for the frame period 1 of the pixel line L1, the red pixel Rp, the green pixel Gp, and the blue pixel Bp in the first pixel line L1 are simultaneously updated at the beginning of the sub period 1 (first time), the red pixel Rp, the green pixel Gp, and the blue pixel Bp in the first pixel line L1 are simultaneously updated at the beginning of the sub period 2, the red pixel Rp, the green pixel Gp, and the blue pixel Bp in the first pixel line L1 are simultaneously updated at the beginning of the sub period 3 (third time), and the red pixel Rp, the green pixel Gp, and the blue pixel Bp in the first pixel line L1 are simultaneously updated at the beginning of the sub period 4 (fourth time). Each length of the sub periods 1 to 4 is equal to a length of one vertical scanning period.

In the backlight BL, turning-on of the first light source G1d (non-light emission ● to light emission ○ in the figure) and turning-off of the second light source G2d in synchronization therewith (light emission ○ to non-light emission ● in the figure) are sequentially performed for each of the divisional illumination areas A1 to Am (in one vertical scanning period), and then, turning-off of the first light source G1d (light emission ○ to non-light emission ● in the figure) and turning-on of the second light source G2d in synchronization therewith (non-light emission ● to light emission ○ in the figure) are sequentially performed for each of the divisional illumination areas A1 to Am (in next one vertical scanning period), and then, turning-on of the first light source G1d (non-light emission ● to light emission ○ in the figure) and turning-off of the second light source G2d in synchronization therewith (light emission ○ to non-light emission ● in the figure) are sequentially performed for each of the divisional illumination areas A1 to Am (in next one vertical scanning period), and further, turning-off of the first light source G1d (light emission ○ to non-light emission ● in the figure) and turning-on of the second light source G2d in synchronization therewith (non-light emission ● to light emission ○ in the figure) are sequentially performed for each of the divisional illumination areas A1 to Am (in next one vertical scanning period).

In the divisional illumination area A1 of the sub period 1 (the divisional illumination area corresponding to the pixel line L1), the second light source G2d does not emit light (● in the figure) and the first light source G1d, the third light source Bd, and the fourth light source Rd emit light (○ in the figure). For each of the pixels of the pixel line L1 in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 2, the first light source G1d does not emit light (● in the figure) and the second light source G2d, the third light source Bd, and the fourth light source Rd emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square □ in the figure).

In the divisional illumination area A1 of the sub period 3 (the divisional illumination area corresponding to the pixel line L1), the second light source G2d does not emit light (● in the figure) and the first light source G1d, the third light source Bd, and the fourth light source Rd emit light (○ in the figure). For each of the pixels of the pixel line L1 in the sub period 3, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 4, the first light source G1d does not emit light (● in the figure) and the second light source G2d, the third light source Bd, and the fourth light source Rd emit light (○ in the figure). For each of the pixels of the pixel line L1 in the sub period 4, the pixel electrodes of the red pixel Rp, the green pixel Gp, and the blue pixel Bp are adjusted to have potentials according to frame data (blank square □ in the figure).

According to Example 5, the effect described in Example 1 is able to be achieved in the first term included in the sub periods 1 and 3 and the second term included in the sub periods 2 and 4. Further, flash of each of the first and second light sources (G1*d* and G2*d*) is hard to be recognized so that it is possible to suppress flicker. Note that, in Example 5 as well, by setting average luminance of each of the sub periods 2 to 4 to be equal to or less than frame average luminance, it is possible to improve moving image response performance. Such a setting may cause flicker, but setting/non-setting is able to be switched only by control of the liquid-crystal panel, so that it is desired to be configured so that setting (moving image response is prioritized) and non-setting (suppression of flicker is prioritized) are able to be switched in accordance with a use form.

EXAMPLE 6

Figure 10:
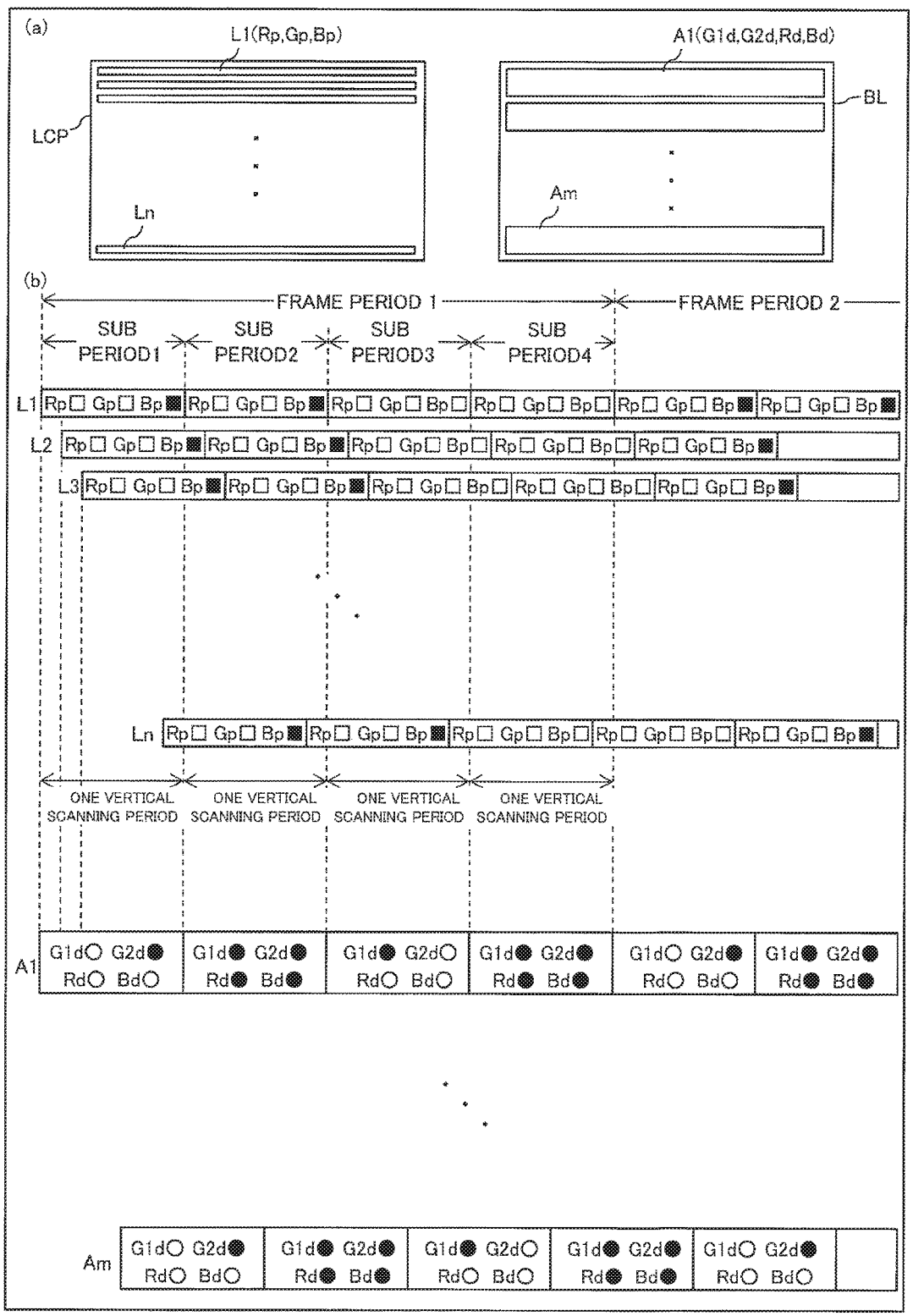
FIG. 10(a) is a block diagram illustrating a configuration of a liquid-crystal display device of Example 6 and (b) is a timing chart illustrating operations of the liquid-crystal display device of Example 6.

FIG. 10(*a*) illustrates a configuration of a liquid-crystal display device of Example 6, and FIG. 10(*b*) illustrates operations of the liquid-crystal display device of Example 6. As illustrated in FIG. 10, it may be configured so that the frame period 1 includes the sub period 1 and the sub period 3, the sub period 2 and the sub period 4 which are black display periods.

As for the frame period 1 of the pixel line L1, the red pixel Rp, the green pixel Gp, and the blue pixel Bp in the first pixel line L1 are simultaneously updated at the beginning of the sub period 1 (first time), the red pixel Rp, the green pixel Gp, and the blue pixel Bp in the first pixel line L1 are simultaneously updated at the beginning of the sub period 2, the red pixel Rp, the green pixel Gp, and the blue pixel Bp in the first pixel line L1 are simultaneously updated at the beginning of the sub period 3 (third time), and the red pixel Rp, the green pixel Gp, and the blue pixel Bp in the first pixel line L1 are simultaneously updated at the beginning of the sub period 4 (fourth time). Each length of the sub periods 1 to 4 is equal to a length of one vertical scanning period.

In the backlight BL, turning-on of the first light source G1*d* (non-light emission ● to light emission ○ in the figure) and turning-on of the third and fourth light sources (Bd and Rd) in synchronization therewith (non-light emission ● to light emission ○ in the figure) are sequentially performed for each of the divisional illumination areas A1 to Am (in one vertical scanning period), and then, turning-off of the first light source G1*d* (light emission ○ to non-light emission ● in the figure) and turning-off of the third and fourth light sources (Bd and Rd) in synchronization therewith (light emission ○ to non-light emission ● in the figure) are performed for each of the divisional illumination areas A1 to Am (in next one vertical scanning period), and turning-on of the second light source G2*d* (non-light emission ● to light emission ○ in the figure) and turning-on of the third and fourth light sources (Bd and Rd) in synchronization therewith (non-light emission ● to light ○ in the figure) are sequentially performed for each of the divisional illumination areas A1 to Am (in next one vertical scanning period), and further, turning-off of the second light source G2*d* (light emission ○ to non-light emission ● in the figure) and turning-off of the third and fourth light sources (Bd and Rd) in synchronization therewith (light emission ○ to non-light emission ● in the figure) are sequentially performed for each of the divisional illumination areas A1 to Am (in next one vertical scanning period).

In the divisional illumination area A1 of the sub period 1 (the divisional illumination area corresponding to the pixel line L1), the second light source G2*d* does not emit light (● in the figure) and the first light source G1*d*, the third light source Bd, and the fourth light source Rd emit light (○ in the figure). For each of the pixels of the pixel line L1 in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 2, all the light sources (G1*d*, G2*d*, Bd, and Rd) do not emit light (● in the figure). For each of the pixels of the pixel line L1 in the sub period 2, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure).

In the divisional illumination area A1 of the sub period 3, the first light source G1*d* does not emit light (● in the figure) and the second light source G2*d*, the third light source Bd, and the fourth light source Rd emit light (○ in the figure). For each of the pixels of the pixel line L1 in the sub period 3, the pixel electrodes of the red pixel Rp, the green pixel Gp, and the blue pixel Bp are adjusted to have potentials according to frame data (blank square □ in the figure).

In the divisional illumination area A1 of the sub period 4, all the light sources (G1*d*, G2*d*, Bd, and Rd) do not emit light (● in the figure). For each of the pixels of the pixel line L1 in the sub period 4, the pixel electrodes of the red pixel Rp, the green pixel Gp, and the blue pixel Bp are adjusted to have potentials according to frame data (blank square □ in the figure).

According to Example 6, the effect described in Example 1 is able to be achieved in the first term included in the sub period 1 and the second term included in the sub period 3. Further, black display is provided in the sub period 2 and the sub period 4, so that intermixing of colors is able to be suppressed.

EXAMPLE 7

Figure 11:
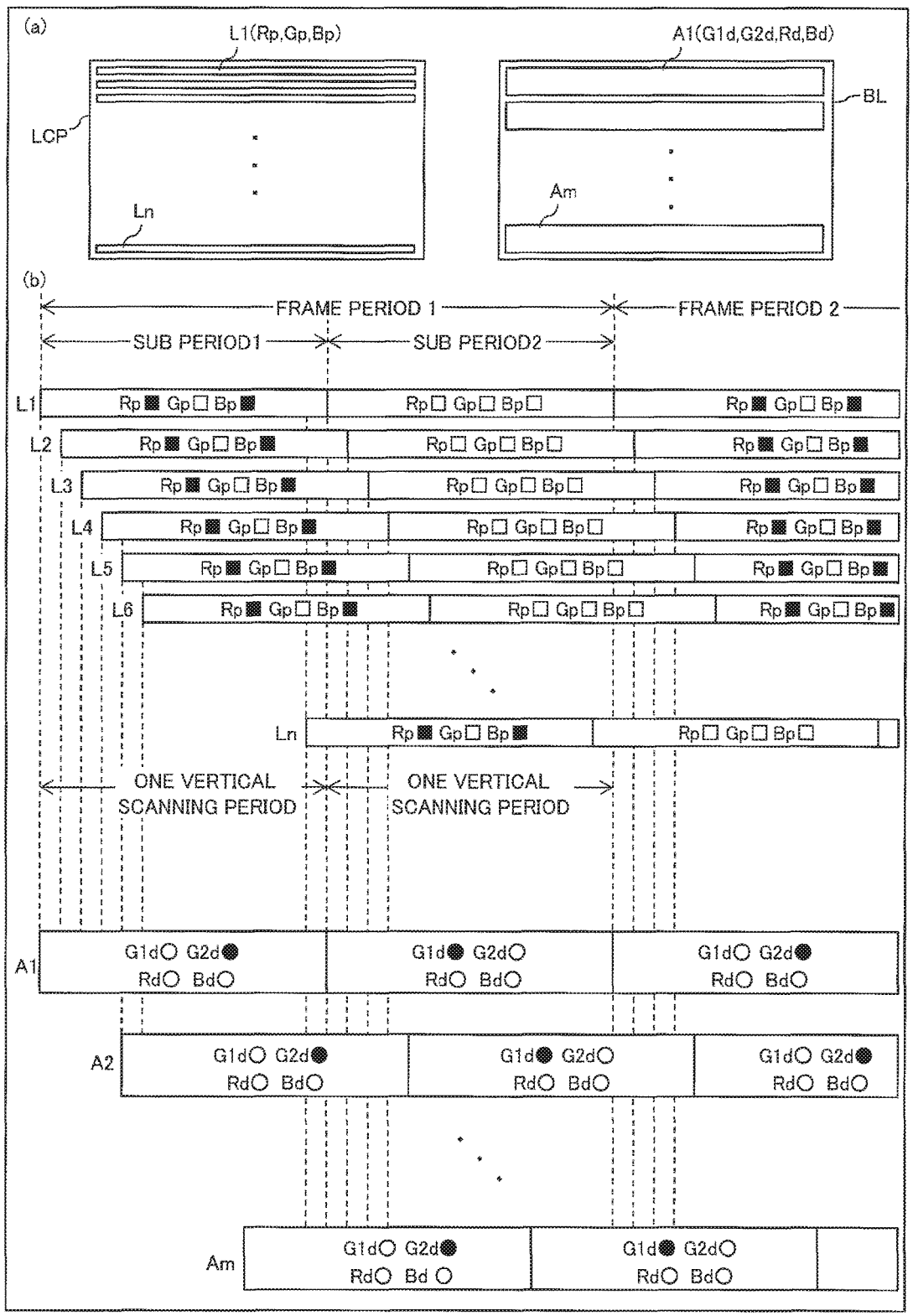
FIG. 11(a) is a block diagram illustrating a configuration of a liquid-crystal display device of Example 7 and (b) is a timing chart illustrating operations of the liquid-crystal display device of Example 7.

FIG. 11(*a*) illustrates a configuration of a liquid-crystal display device of Example 7, and FIG. 11(*b*) illustrates operations of the liquid-crystal display device of Example 7. As illustrated in FIG. 11, the control of the red pixel may be performed in accordance with the control of the blue pixel.

As for the frame period 1 of the pixel line L1, the frame period 1 includes the sub period 1 and the sub period 2, and the red pixel Rp, the green pixel Gp, and the blue pixel Bp in the first pixel line L1 are simultaneously updated at the beginning of the sub period 1 (first time) and the red pixel Rp, the green pixel Gp, and the blue pixel Bp in the first pixel line L1 are simultaneously updated at the beginning of the sub period 2 (second time). Each length of a sub period x and a sub period y is equal to a length of one vertical scanning period.

In the backlight BL, turning-on of the first light source G1*d* (non-light emission ● to light emission ○ in the figure) and turning-off of the second light source G2*d* and the third light source Bd in synchronization therewith (light emission ○ to non-light emission ● in the figure) are sequentially performed for each of the divisional illumination areas A1 to Am (in one vertical scanning period), and then, turning-off of the first light source G1*d* (light emission ○ to non-light emission ● in the figure) and turning-on of the second light source G2*d* and the third light source Bd in synchronization therewith (non-light emission ● to light emission ○ in the figure) are sequentially performed for each of the divisional illumination areas A1 to Am (in next one vertical scanning period). The fourth light source Rd emits light at all times (○ in the figure) and does not flash.

In the divisional illumination area A1 of the sub period 1, the second light source G2d does not emit light (● in the figure) and the first light source G1d, the third light source Bd, and the fourth light source Rd emit light (○ in the figure). For each of the pixels of the pixel line L1 in the sub period 1, the pixel electrodes of the blue pixel Bp and the red pixel Rp are adjusted to have potentials near a black level regardless of frame data (solid square in the figure) and the pixel electrode of the green pixel Gp is adjusted to have a potential according to frame data (blank square □ in the figure).

In the divisional illumination area A1 of the sub period 2, the first light source G1d does not emit light (● in the figure) and the second light source G2d, the third light source Bd, and the fourth light source Rd emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square □ in the figure).

According to Example 7, the effect described in Example 1 is able to be achieved in the first term included in the sub period 1 and the second term included in the sub period 2. Further, it is possible to take a balance of luminance between the blue pixel and the red pixel.

EXAMPLE 8

Figure 12:
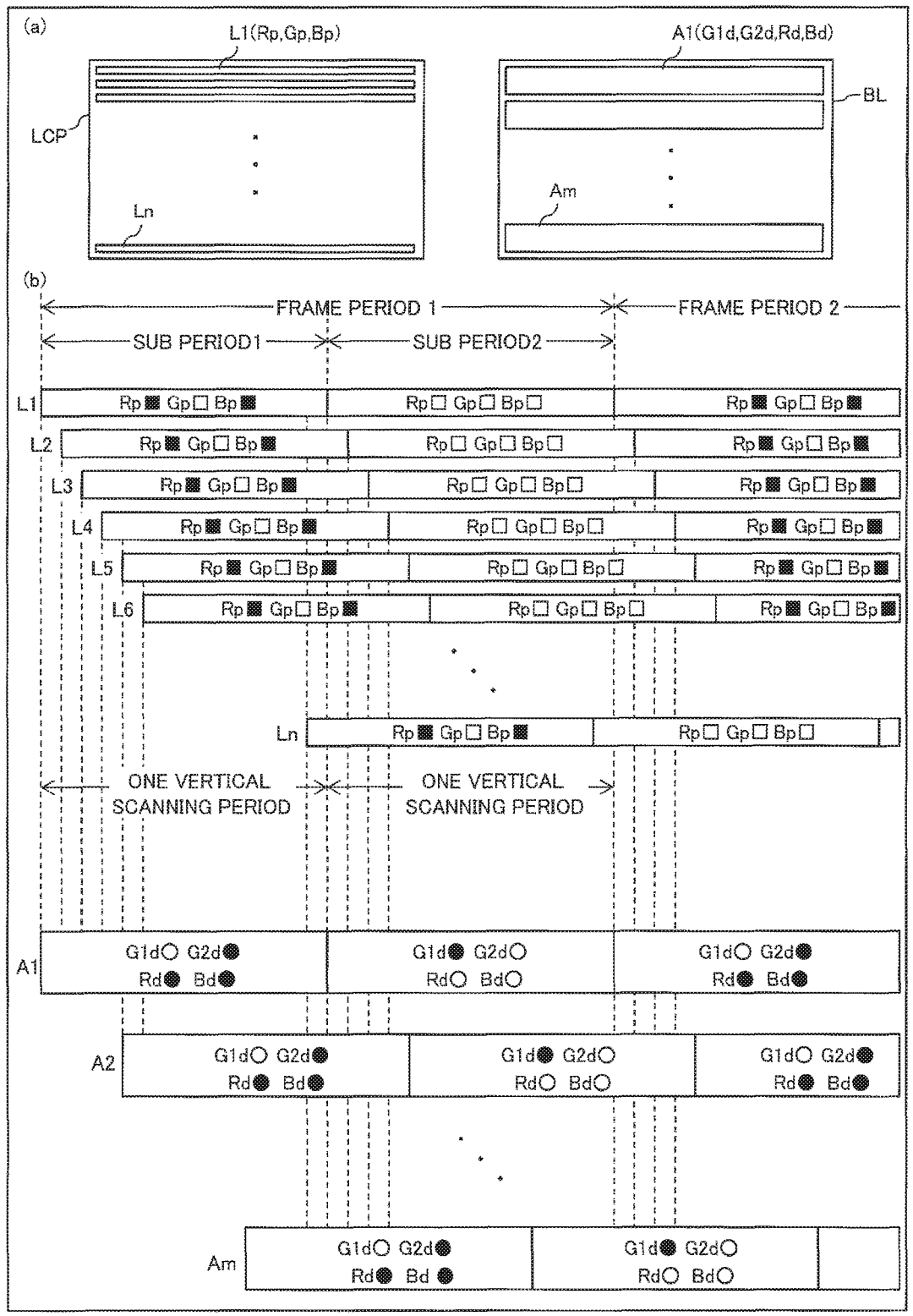
FIG. 12(a) is a block diagram illustrating a configuration of a liquid-crystal display device of Example 8 and (b) is a timing chart illustrating operations of the liquid-crystal display device of Example 8.

FIG. 12(a) illustrates a configuration of a liquid-crystal display device of Example 8, and FIG. 12(b) illustrates operations of the liquid-crystal display device of Example 8. As illustrated in FIG. 12, the fourth light source Rd may flash in accordance with the control of the red pixel Rp in Example 7.

That is, in the backlight BL, turning-on of the first light source G1d (non-light emission ● to light emission ○ in the figure) and turning-off of the second light source G2d, the third light source Bd, and the fourth light source Bd in synchronization therewith (light emission ○ to non-light emission ● in the figure) are sequentially performed for each of the divisional illumination areas A1 to Am (in one vertical scanning period), and then, turning-off of the first light source G1d (light emission ○ to non-light emission ● in the figure) and turning-on of the second light source G2d, the third light source Bd, and the fourth light source Rd in synchronization therewith (non-light emission ● to light emission ○ in the figure) are sequentially performed for each of the divisional illumination areas A1 to Am (in next one vertical scanning period).

In the divisional illumination area A1 of the sub period 1, the second light source G2d, the third light source Bd, and the fourth light source Rd do not emit light (● in the figure) and the first light source G1d emits light (○ in the figure). For each of the pixels of the pixel line L1 in the sub period 1, the pixel electrodes of the blue pixel Bp and the red pixel Rp are adjusted to have potentials near a black level regardless of frame data (solid square in the figure) and the pixel electrode of the green pixel Gp is adjusted to have a potential according to frame data (blank square □ in the figure).

In the divisional illumination area A1 of the sub period 2, the first light source G1d does not emit light (● in the figure) and the second light source G2d, the third light source Bd, and the fourth light source Rd emit light (○ in the figure). For each of the pixels of the pixel line L1 in the sub period 2, the pixel electrodes of the red pixel Rp, the green pixel Gp, and the blue pixel Bp are adjusted to have potentials according to frame data (blank square □ in the figure).

In Example 8, the effect described in Example 1 is able to be achieved in the first term included in the sub period 1 and the second term included in the sub period 2. Further, since the fourth light source Rd does not emit light in the period in which the pixel electrode of the red pixel Rp is adjusted to have a potential near a black level, it is possible to suppress power consumption of the fourth light source Rd and also possible to suppress intermixing of colors (transmission of the green pixel and the blue pixel of red light).

EXAMPLE 9

Figure 13:
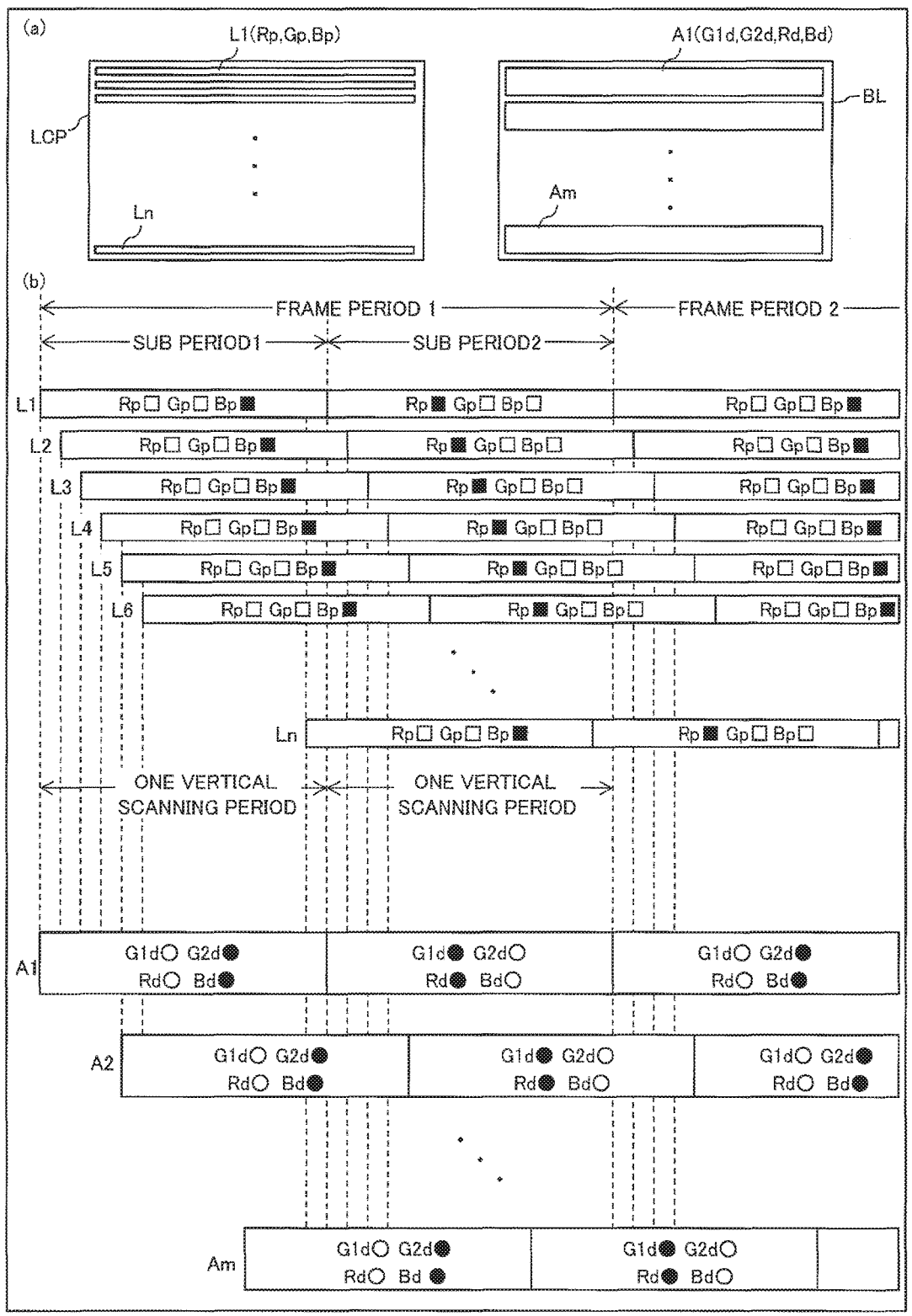
FIG. 13(a) is a block diagram illustrating a configuration of a liquid-crystal display device of Example 9 and (b) is a timing chart illustrating operations of the liquid-crystal display device of Example 9.

FIG. 13(a) illustrates a configuration of a liquid-crystal display device of Example 9, and FIG. 13(b) illustrates operations of the liquid-crystal display device of Example 9. As illustrated in FIG. 13, it is also possible that control of the blue pixel and the control of the red pixel are reversed so that the third light source Bd and the fourth light source Rd flash in accordance with the control of the blue pixel and the red pixel.

That is, in the backlight BL, turning-on of the first light source G1d and the fourth light source Rd (non-light emission ● to light emission ○ in the figure) and turning-off of the second light source G2d and the third light source Bd in synchronization therewith (light emission ○ to non-light emission ● in the figure) are sequentially performed for each of the divisional illumination areas A1 to Am (in one vertical scanning period), and then, turning-off of the first light source G1d and the fourth light source Rd (light emission ○ to non-light emission ● in the figure) and turning-on of the second light source G2d and the third light source Bd in synchronization therewith (non-light emission ● to light emission ○ in the figure) are sequentially performed for each of the divisional illumination areas A1 to Am (in next one vertical scanning period).

In the divisional illumination area A1 of the sub period 1, the second light source G2d and the third light source Bd do not emit light (● in the figure) and the first light source G1d and the fourth light source Rd emit light (○ in the figure). For each of the pixels of the pixel line L1 in the sub period 1, the pixel electrode of the blue pixel Bp is adjusted to have a potential near a black level regardless of frame data (solid square in the figure) and the pixel electrodes of the green pixel Gp and the red pixel Rp are adjusted to have potentials according to frame data (blank square □ in the figure).

In the divisional illumination area A1 of the sub period 2, the first light source G1d and the fourth light source Rd do not emit light (● in the figure) and the second light source G2d and the third light source Bd emit light (○ in the figure). For each of the pixels of the pixel line L1 in the sub period 2, the pixel electrode of the red pixel Rp is adjusted to have a potential near a black level regardless of frame data (solid square in the figure) and the pixel electrodes of the green pixel Gp and the blue pixel Bp are adjusted to have potentials according to frame data (blank square □ in the figure).

In Example 9, the effect described in Example 1 is able to be achieved in the first term included in the sub period 1 and the second term included in the sub period 2. In addition, it is possible to suppress not only intermixing of colors caused when light (deep green) from the first light source G1d transmits the blue pixel but also intermixing of colors caused when light (light green) from the second light source G2d transmits the red pixel, and also possible to suppress power consumption of the third light source Bd and the fourth light source Rd.

EXAMPLE 10

Figure 14:
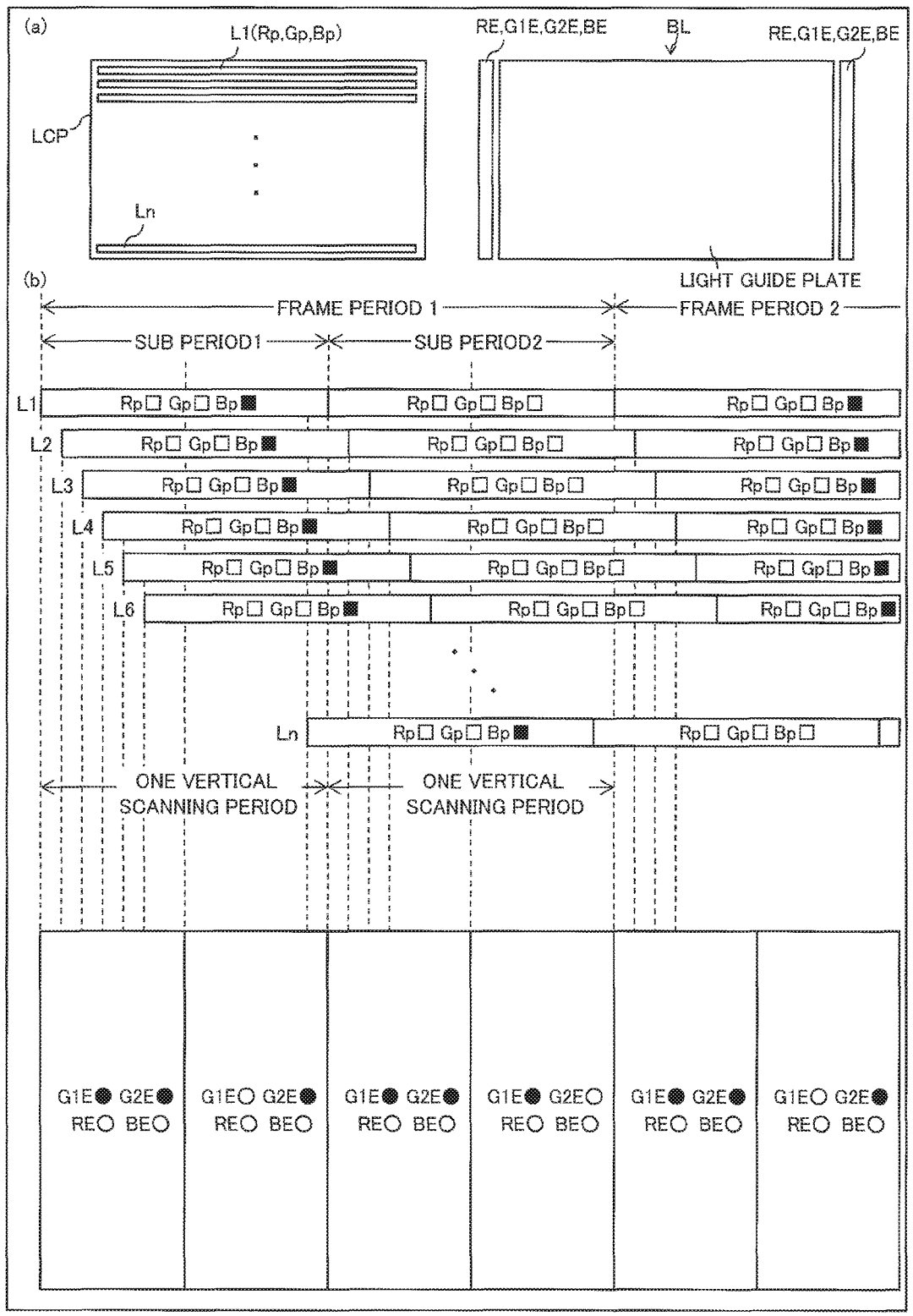
FIG. 14(a) is a block diagram illustrating a configuration of a liquid-crystal display device of Example 10 and (b) is a timing chart illustrating operations of the liquid-crystal display device of Example 10.

FIG. 14(a) illustrates a configuration of a liquid-crystal display device of Example 10, and FIG. 14(b) illustrates operations of the liquid-crystal display device of Example 10. As illustrated in FIG. 14, it is also possible to control the entire backlight BL uniformly without dividing the area (without providing divisional illumination areas). In Example 10, for example, an edge light type in which first to fourth light sources (RE, G1E, G2E, and BE) are arranged below edges (both sides) of the liquid-crystal panel (light guiding is performed by a light guide plate) is also allowed (refer to FIG. 14).

As for the frame period 1 of the pixel line L1, the red pixel Rp, the green pixel Gp, and the blue pixel Bp in the first pixel line L1 are simultaneously updated at the beginning of the sub period 1 (first time) and the red pixel Rp, the green pixel Gp, and the blue pixel Bp in the first pixel line L1 are simultaneously updated at the beginning of the sub period 2 (second time). Thereby, in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure). In the sub period 2, the pixel electrodes of the blue pixel Bp, the red pixel Rp, and the green pixel Gp are adjusted to have potentials according to frame data (blank square □ in the figure). Note that, each length of the sub period 1 and the sub period 2 is equal to that of one vertical scanning period.

In FIG. 14, when a delay of a response of the liquid-crystal layer is ignored, the liquid-crystal layer of each blue pixel in the pixel lines L1 to Ln has a black level at an end stage of the sub period 1 (first term) and the pixel electrode of each blue pixel in the pixel lines L1 to Ln is adjusted to have a potential corresponding to frame data at an end stage of the sub period 2 (second term).

Thus, in the backlight BL, turning-off of the second light source G2E (light emission ○ to non-light emission ● in the figure) is performed at the beginning of a first half of the sub period 1, turning-on of the first light source G1E (non-light emission to ● light emission ○ in the figure) is performed at the beginning of a last half of the sub period 1, turning-off of the first light source G1E (light emission ○ to non-light emission ● in the figure) is performed at the beginning of a first half of the sub period 2, and turning-on of the second light source G2E (non-light emission ● to light emission ○ in the figure) is performed at the beginning of a last half of the sub period 2. The third and fourth light sources (BE and RE) emit light at all times.

Thereby, it is possible to reduce leakage of green light in the blue pixel and achieve improvement in color purities of blue and green without dividing the area of the backlight BL.

Figure 15:
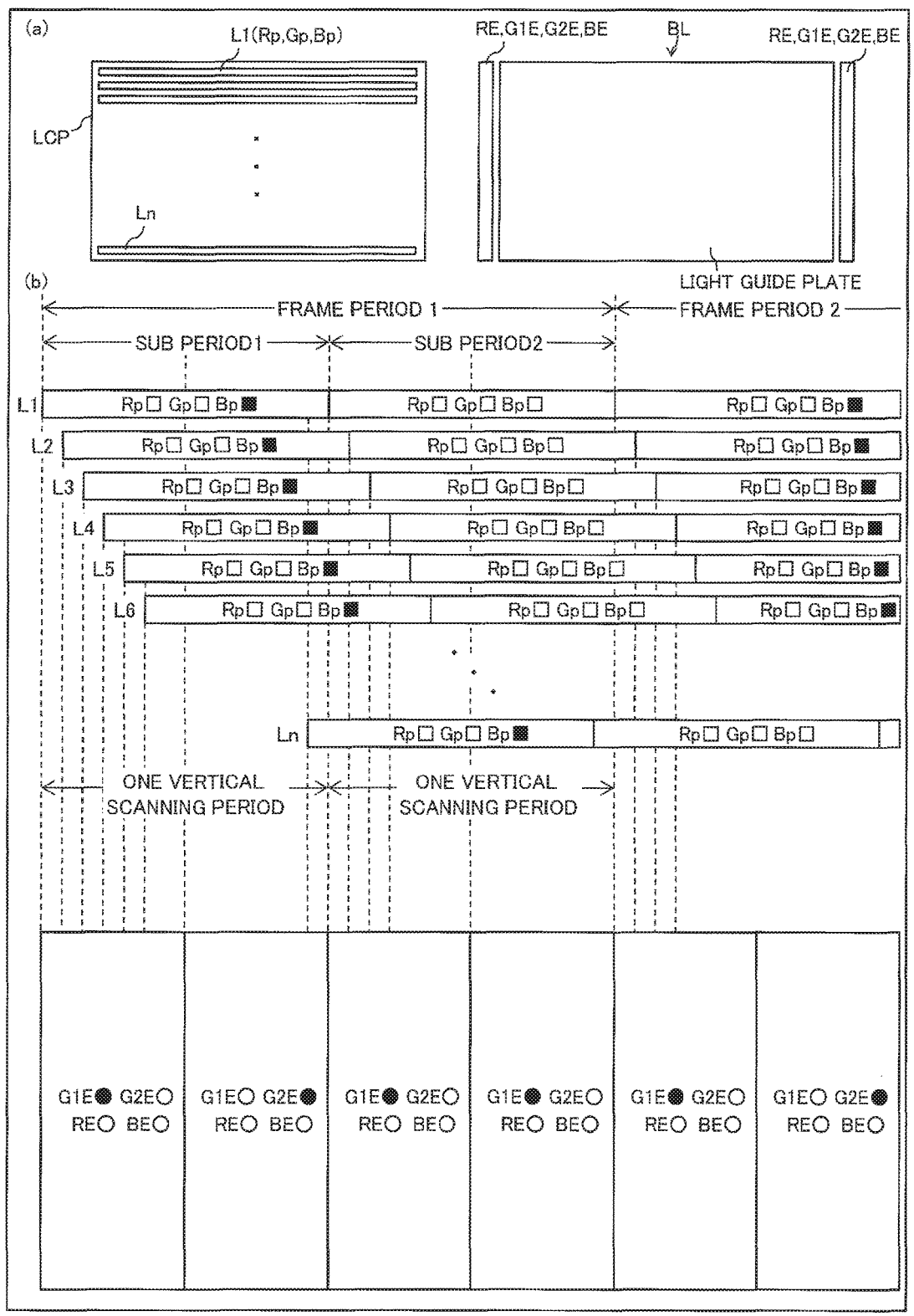
FIG. 15(a) is a block diagram illustrating a modified example of the liquid-crystal display device of Example 10 and (b) is a timing chart illustrating operations of the liquid-crystal display device of Example 10.

A method for controlling the backlight BL in FIG. 14 is also able to be modified as in FIG. 15. That is, the second light source G2E emits light (the first light source G1E does not emit light) in each of the first half of the sub period 1 and the first half of the sub period 2. This makes it possible to achieve improvement in color purities of blue and green, suppression of flicker, and improvement in display luminance without dividing the area of the backlight BL.

EXAMPLE 11

Figure 16:
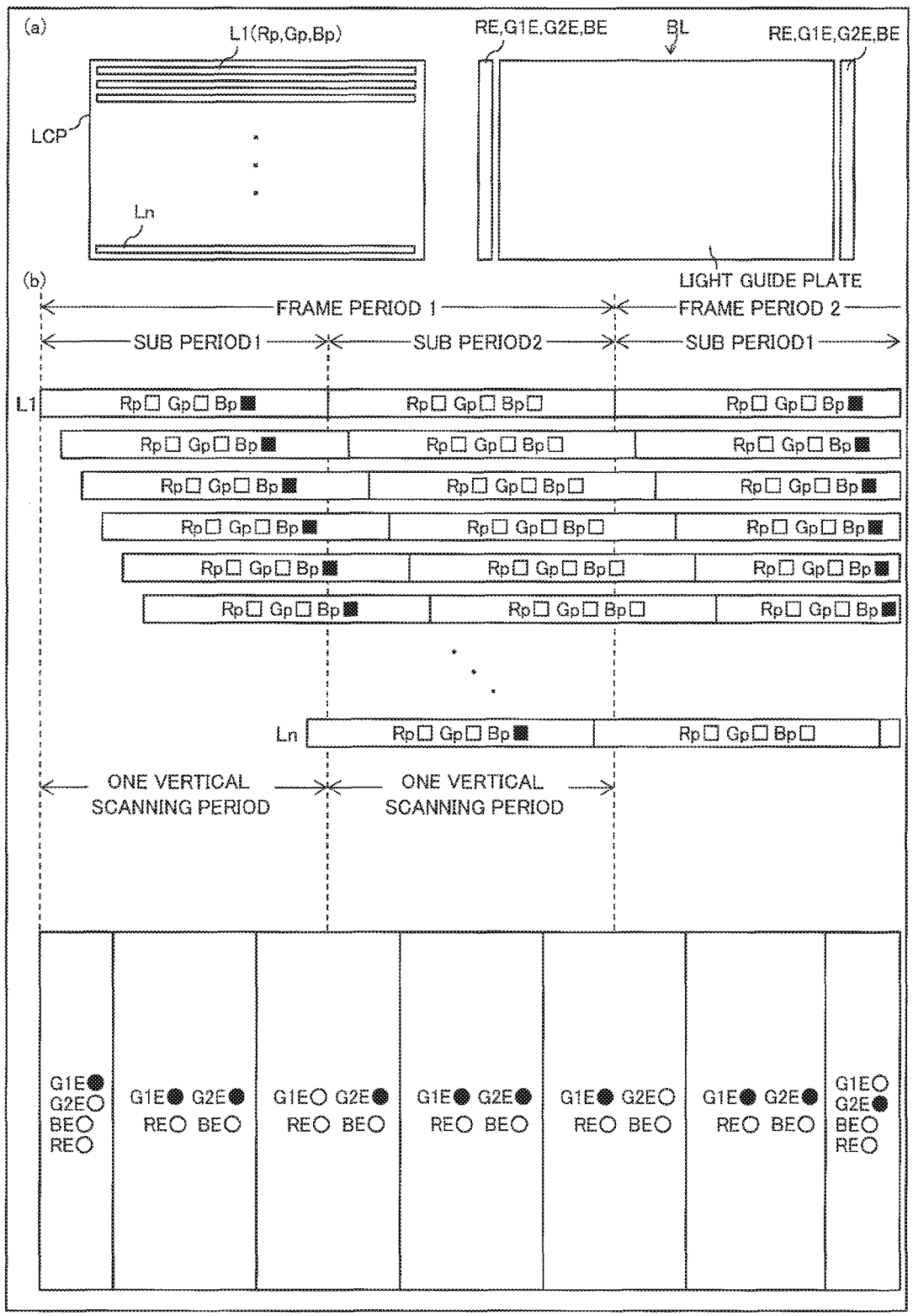
FIG. 16(a) is a block diagram illustrating a configuration of a liquid-crystal display device of Example 11 and (b) is a timing chart illustrating operations of the liquid-crystal display device of Example 11.

In a case where a sufficient effect is not achieved even by controlling the backlight BL as in FIG. 14 or FIG. 15 because of, for example, a delay of a response of a liquid-crystal layer, it is also possible to control the liquid-crystal display device as in FIG. 16. FIG. 16(a) illustrates a configuration of a liquid-crystal display device of Example 11, and FIG. 16(b) illustrates operations of the liquid-crystal display device of Example 11. Note that, as for the frame period 1 of the pixel line L1, the red pixel Rp, the green pixel Gp, and the blue pixel Bp in the first pixel line L1 are simultaneously updated at the beginning of the sub period 1 (first time) and the red pixel Rp, the green pixel Gp, and the blue pixel Bp in the first pixel line L1 are simultaneously updated at the beginning of the sub period 2 (second time). Thereby, in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure). In the sub period 2, the pixel electrodes of the blue pixel Bp, the red pixel Rp, and the green pixel Gp are adjusted to have potentials according to frame data (blank square □ in the figure). Note that, each length of the sub period 1 and the sub period 2 is equal to that of one vertical scanning period.

In a case where a time required for substantial completion of a liquid-crystal response (here, the completion indicates about 80% of a shift of a transmittance on the premise that a sufficient effect of improvement in color purities is achieved) is about a quarter frame period, the liquid-crystal layer of each blue pixel Bp in the pixel lines L1 to Ln has a black level in the fourth quarter of the sub period 1 (the fourth one when the sub period 1 is divided into four on a time-series basis) to the first quarter of the sub period 2 (these terms correspond to a first term) and the liquid-crystal layer of each blue pixel Bp in the pixel lines L1 to Ln is adjusted to have a transmittance according to frame data in the fourth quarter of the sub period 2 to the first quarter of the sub period 1 of the frame period 2 (these terms correspond to a second term).

Thus, as illustrated in FIG. 16, in the backlight BL, turning-off of the second light source G2E (light emission ○ to non-light emission ● in the figure) is performed at the beginning of the second quarter of the sub period 1, turning-on of the first light source G1E (non-light emission ● to light emission ○ in the figure) is performed at the beginning of the fourth quarter of the sub period 1, turning-off of the first light source G1E (light emission ○ to non-light emission ● in the figure) is performed at the beginning of the second quarter of the sub period 2, and turning-on of the second light source G2E (non-light emission ● to light emission ○ in the figure) is performed at the beginning of the fourth quarter of the sub period 2. The third and fourth light sources (BE and RE) emit light at all times.

Thereby, it is possible to reduce leakage of green light in the blue pixel and achieve improvement in color purities of blue and green in consideration of a response time of a liquid-crystal layer without dividing the area of the backlight BL.

Figure 17:
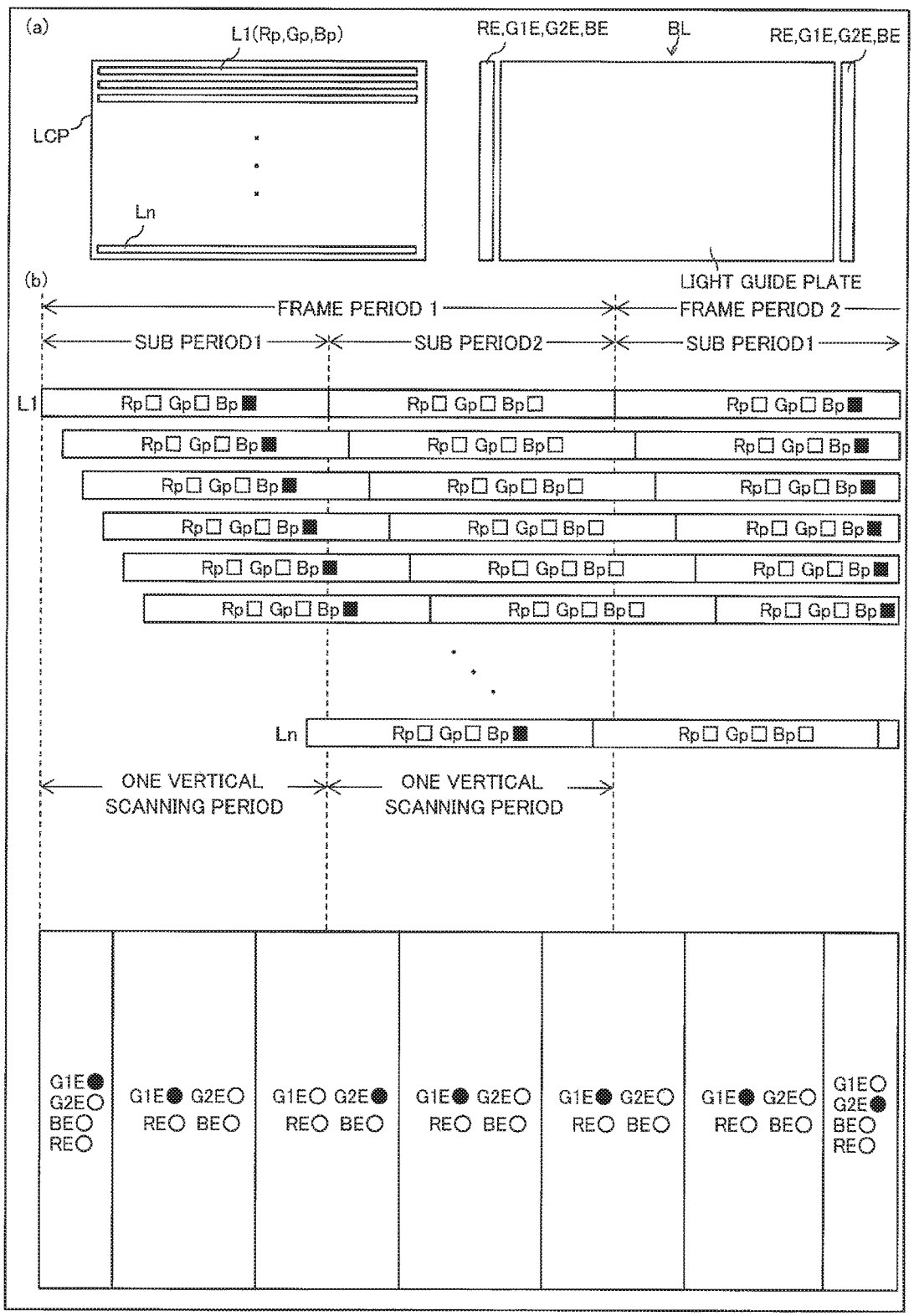
FIG. 17(a) is a block diagram illustrating a modified example of the liquid-crystal display device of Example 11 and (b) is a timing chart illustrating operations of the liquid-crystal display device of Example 11.

A method for controlling the backlight BL in FIG. 16 is also able to be modified as in FIG. 17. That is, the second light source G2E emits light (the first light source G1E does not emit light) in each of the second and third quarters of the sub period 1 and the second and third quarters of the sub period 2. This makes it possible to achieve improvement in color purities of blue and green, suppression of flicker, and improvement in display luminance.

EXAMPLE 12

Figure 18:
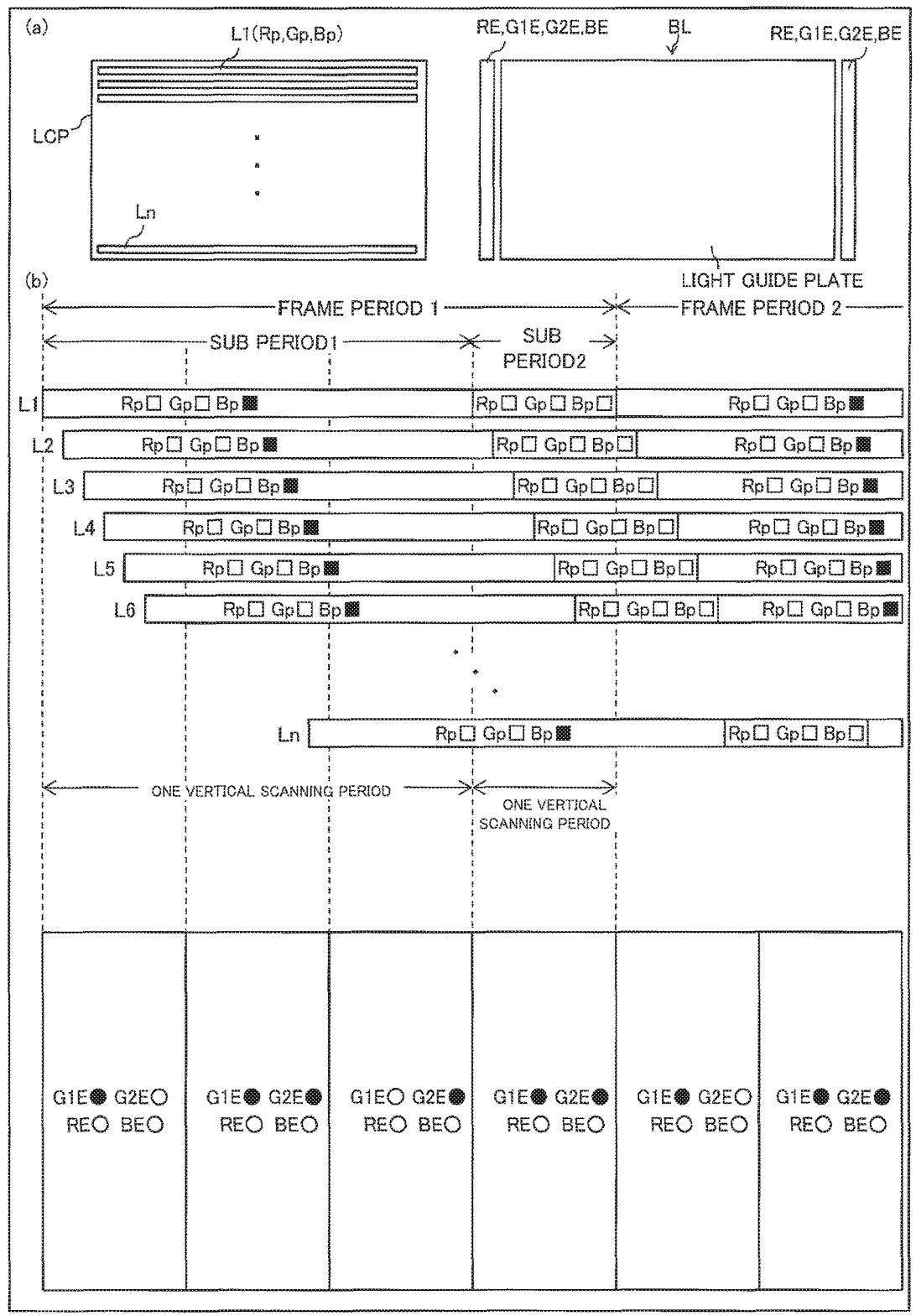
FIG. 18(a) is a block diagram illustrating a configuration of a liquid-crystal display device of Example 12 and (b) is a timing chart illustrating operations of the liquid-crystal display device of Example 12.

When a liquid-crystal response is slow or when a great effect of improvement in color purities is required, it is also possible to control the liquid-crystal display device as in FIG. 18. FIG. 18(a) illustrates a configuration of a liquid-crystal display device of Example 12, and FIG. 18(b) illustrates operations of the liquid-crystal display device of Example 12. In Example 12, three quarters of one frame period is allocated to the sub period 1 and the remaining one quarter is allocated to the sub period 2.

As for the frame period 1 of the pixel line L1, the red pixel Rp, the green pixel Gp, and the blue pixel Bp in the first pixel line L1 are simultaneously updated at the beginning of the sub period 1 (first time) and the red pixel Rp, the green pixel Gp, and the blue pixel Bp in the first pixel line L1 are simultaneously updated at the beginning of the sub period 2 (second time). Note that, the vertical scanning period of the sub period 1 is three times the vertical scanning period of the sub period 2. Thereby, in the sub period 1, the pixel electrode of the blue pixel Bp is adjusted to have a potential near a black level regardless of frame data (solid square in the figure) and the pixel electrodes of the red pixel Rp and the green pixel Gp are adjusted to have potentials according to frame data (blank square □ in the figure). In the sub period 2, the pixel electrodes of the blue pixel Bp, the red pixel Rp, and the green pixel Gp are adjusted to have potentials according to frame data (blank square □ in the figure).

In a case where a time required for substantial completion of a liquid-crystal response (here, the completion indicates about 95% or more of a shift of a transmittance) is about a half frame period, the liquid-crystal layer of each blue pixel Bp in the pixel lines L1 to Ln has a black level in the last period (first term) when the sub period 1 of the frame period 1 is divided into three (first period, middle period, last period) on a time-series basis and the liquid-crystal layer of each blue pixel Bp in the pixel lines L1 to Ln is adjusted to have a transmittance according to frame data in the first period (second term) of the sub period 1 of the frame period 2.

Thus, as illustrated in FIG. 18, in the backlight BL, turning-on of the second light source G2E (non-light emission ● to light emission ○ in the figure) is performed at the beginning of the first period of the sub period 1, turning-off of the second light source G2E (light emission ○ to non-light emission ● in the figure) is performed at the beginning of the middle period of the sub period 1, turning-on of the first light source G1E (non-light emission ● to light emission ○ in the figure) is performed at the beginning of the last period of the sub period 1, and turning-off of the first light source G1E (light emission ○ to non-light emission ● in the figure) is performed at the beginning of the sub period 2. The third and fourth light sources (BE and RE) emit light at all times.

Thereby, it is possible to reduce leakage of green light in the blue pixel and achieve improvement in color purities of blue and green in consideration of a sufficient response time of a liquid-crystal layer without dividing the area of the backlight BL.

Figure 19:
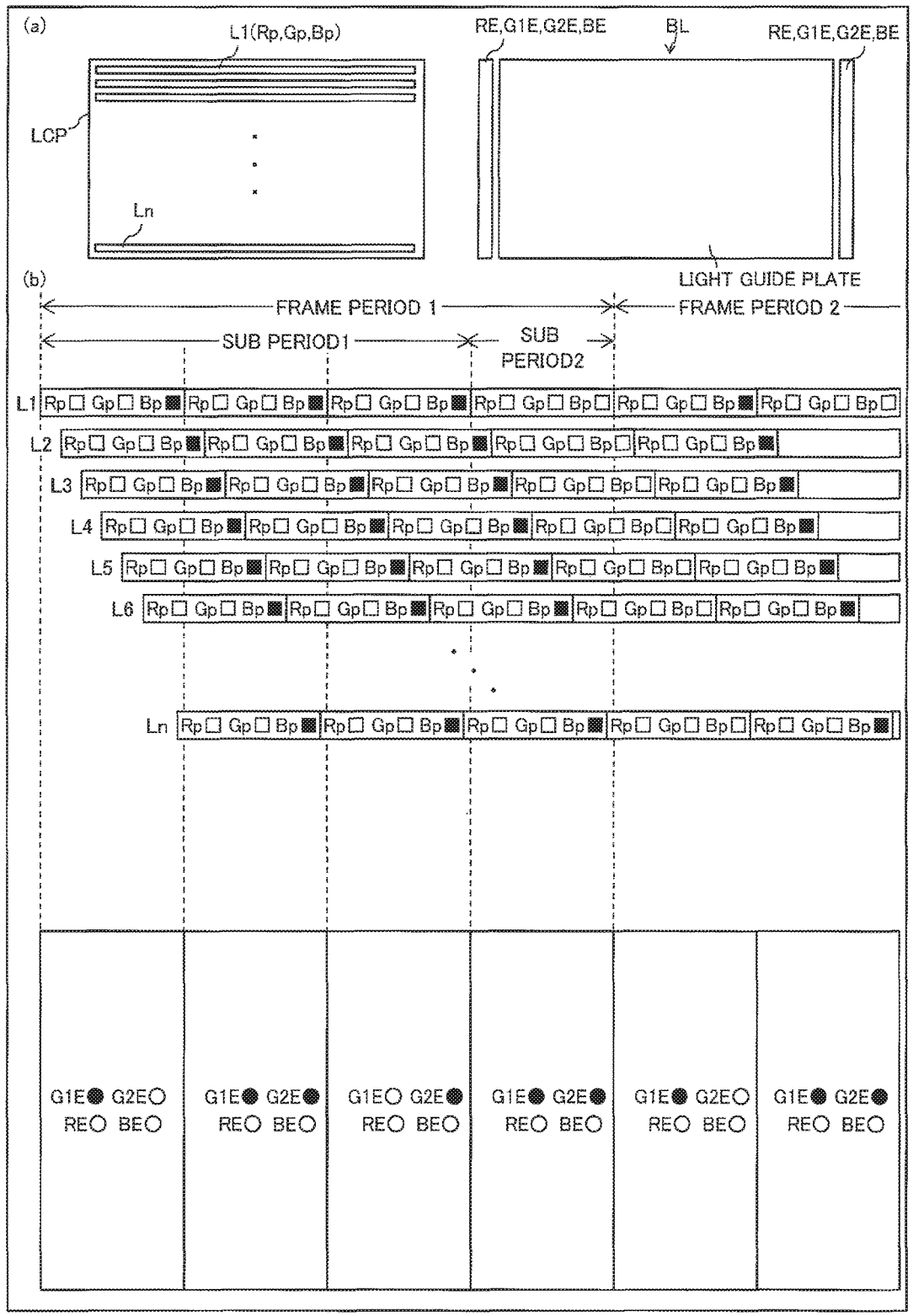
FIG. 19(a) is a block diagram illustrating a modified example of the liquid-crystal display device of Example 12 and (b) is a timing chart illustrating operations of the liquid-crystal display device of Example 12.

In Example 12, the liquid-crystal panel LCP may be driven as in FIG. 19. As for the frame period 1 of the pixel line L1, the red pixel Rp, the green pixel Gp, and the blue pixel Bp in the first pixel line L1 are updated one time at the beginning of each of the first period, the middle period, and the last period of the sub period 1 (three times in total) and the red pixel Rp, the green pixel Gp, and the blue pixel Bp in the first pixel line L1 are updated one time at the beginning of the sub period 2 (fourth time). Note that, the control of the backlight BL is the same as that of FIG. 18.

Figure 20:
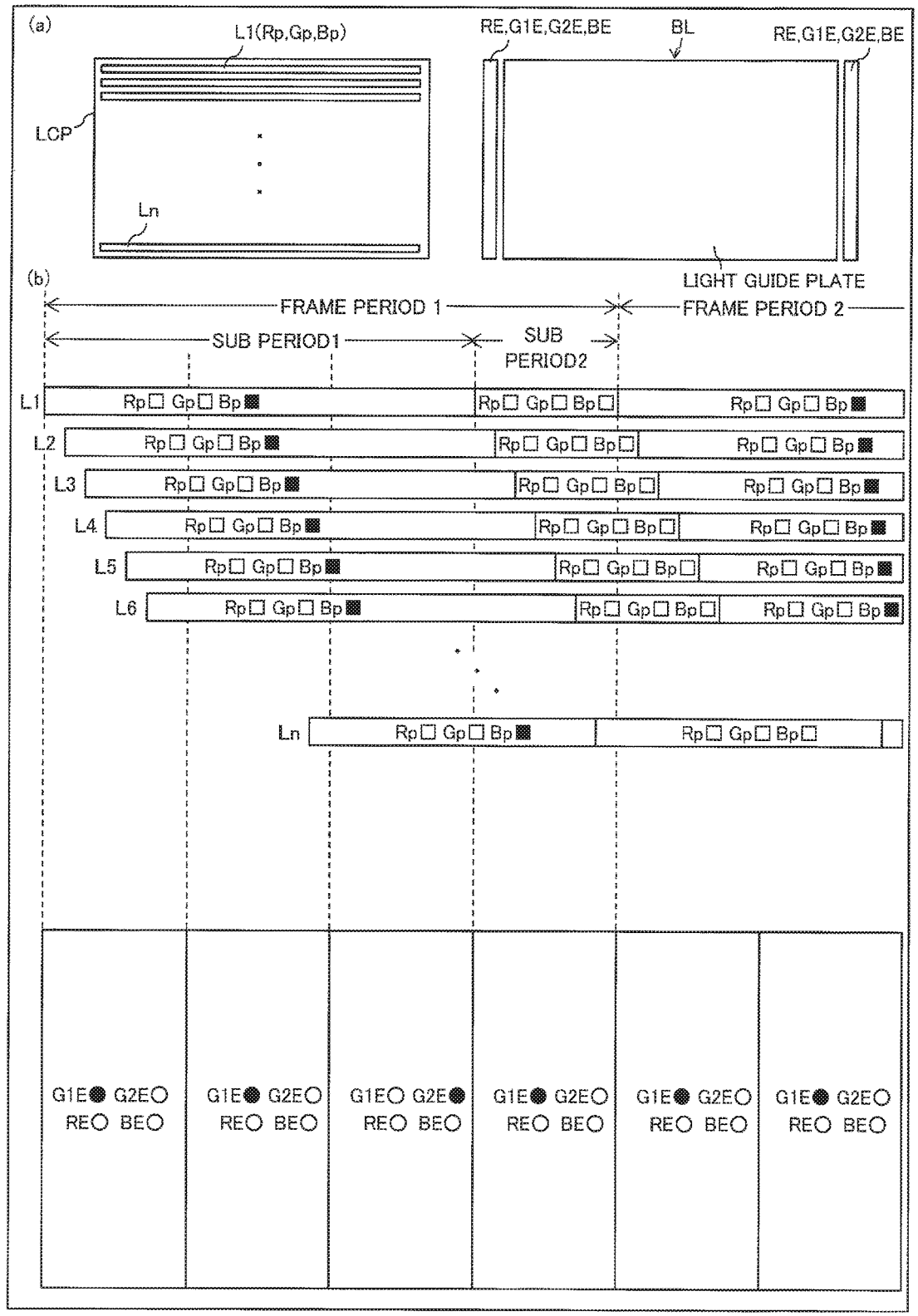
FIG. 20(a) is a block diagram illustrating another modified example of the liquid-crystal display device of Example 12 and (b) is a timing chart illustrating operations of the liquid-crystal display device of Example 12.

A method for controlling the backlight BL in FIG. 18 is also able to be modified as in FIG. 20. That is, the second light source G2E emits light (the first light source G1E does not emit light) in each of the middle period of the sub period 1, and the sub period 2. This makes it possible to achieve improvement in color purities of blue and green, suppression of flicker, and improvement in display luminance.

[About Examples Above]

Figure 21:
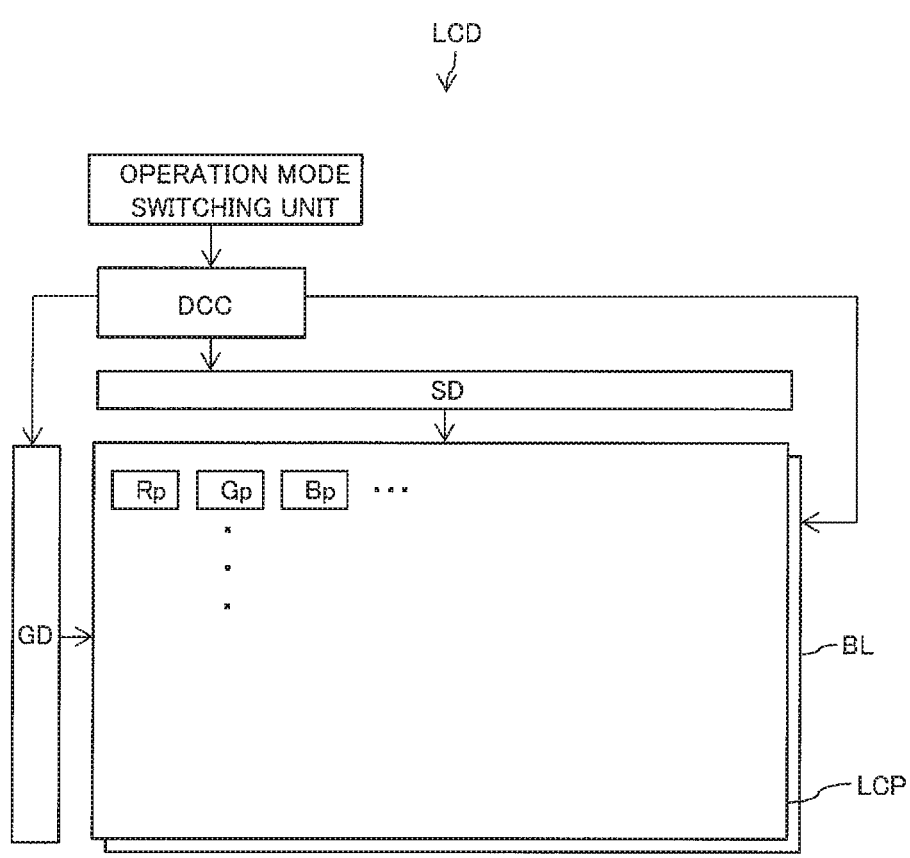
FIG. 21 is a block diagram illustrating a modified example of the liquid-crystal display device according to the present embodiment.

The liquid-crystal display device of FIG. 1 may be provided with an operation mode switching unit as in FIG. 21. The operation mode switching unit gives a command to switch an operation mode to the display control circuit DCC based on an instruction from a user. That is, a liquid-crystal display device LCD of FIG. 21 is able to perform switching between each operation mode described in Examples above and a conventional operation mode in which at least one of the first and second light sources, and the third and the fourth light sources emit light and a period in which each of the red pixel, the green pixel, and the blue pixel is adjusted to have a transmittance according to frame data is set. Note that, FIG. 22 illustrates an operation of the liquid-crystal display device in a case where an operation mode A of Example 1 and an operation mode B as the conventional one are switched.

Figure 22:
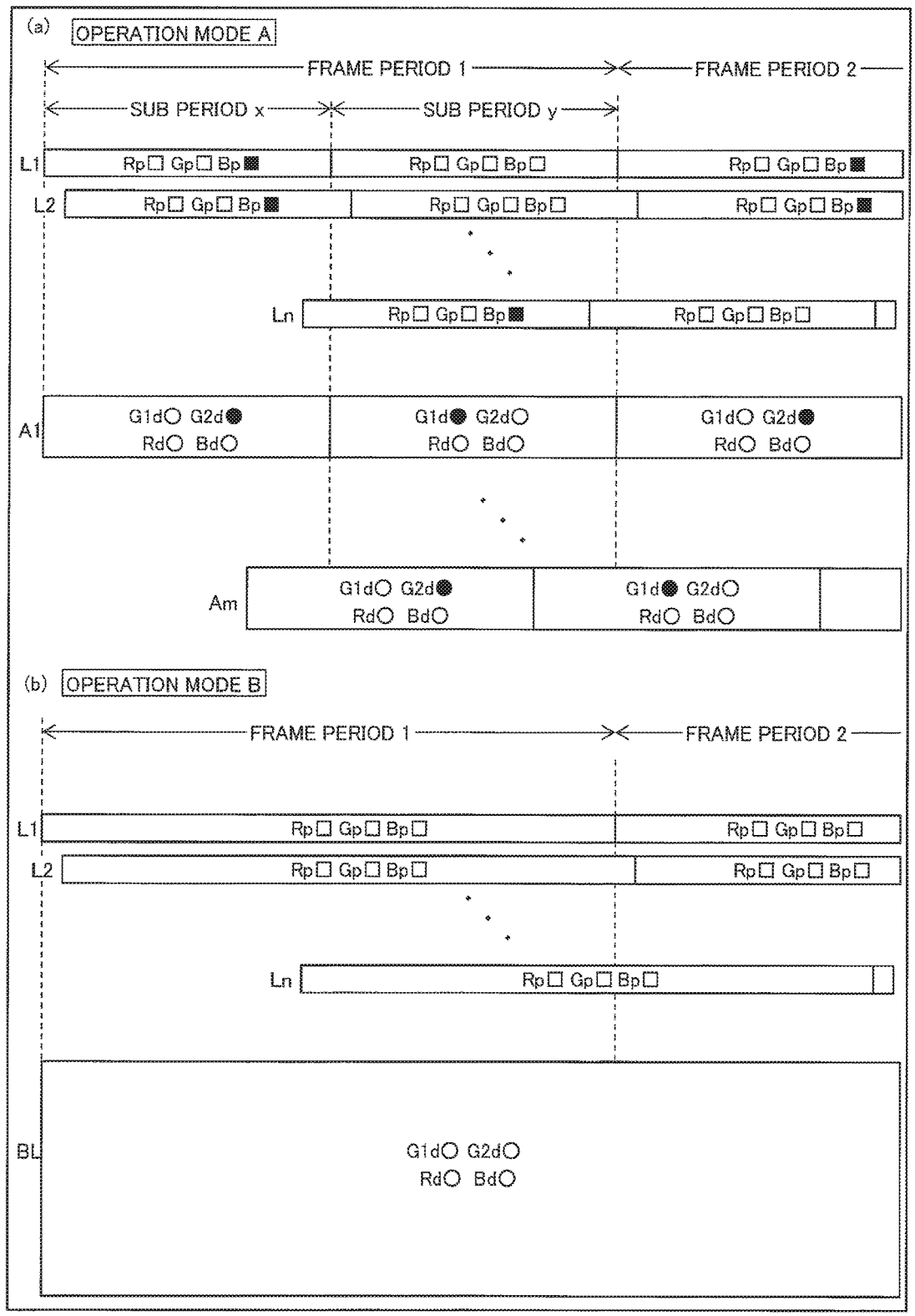
FIG. 22 is a timing chart illustrating switching of an operation mode of the liquid-crystal display device of FIG. 15.

A configuration in which not only the switching as in FIG. 22, for example, but also switching based on a user instruction between one Example and another Example which are described above (for example, switching between Example 8 of FIG. 12 and Example 9 of FIG. 13) is possible is more desirable.

It is desirable to use an LED of around 520 nm in light emission peak wavelength for the first light source G1d. Such an LED is highly efficient and easy to use, but has a lot of missing (transmission) in the blue pixel, so that an effect of the present embodiment for suppressing such missing is conspicuous.

A quantum dot may be used for the second light source in Examples 1 to 10. The quantum dot is an element emitting light in respective colors with a quantum effect by radiation of blue light and the like, and usage thereof makes it easy to control a light source linked with the third light source (blue). For the quantum dot, a spectrum design is easy so that color adjustment is able to be performed appropriately. Note that, the quantum dot may be used for the fourth light source (red) in FIG. 12 and the like. Further, a fluorescent film (for example, an orthosilicate phosphor) excited by blue light may be used for at least one of the second light source and the fourth light source.

Though it is set in Example 1 that the first light source G1d emits light at all times in the sub period 1 and the second light source G2d emits light at all times in the sub period 2 for convenience of description, it is possible to change peak luminance of each light source, change a duty ratio in the case of driving at high frequencies, or additionally setting a period in which a light source is turned off in a sub period, for example, in order to adjust an accumulated light amount of a frame of each light source aiming adjustment of a color balance.

Figure 23:
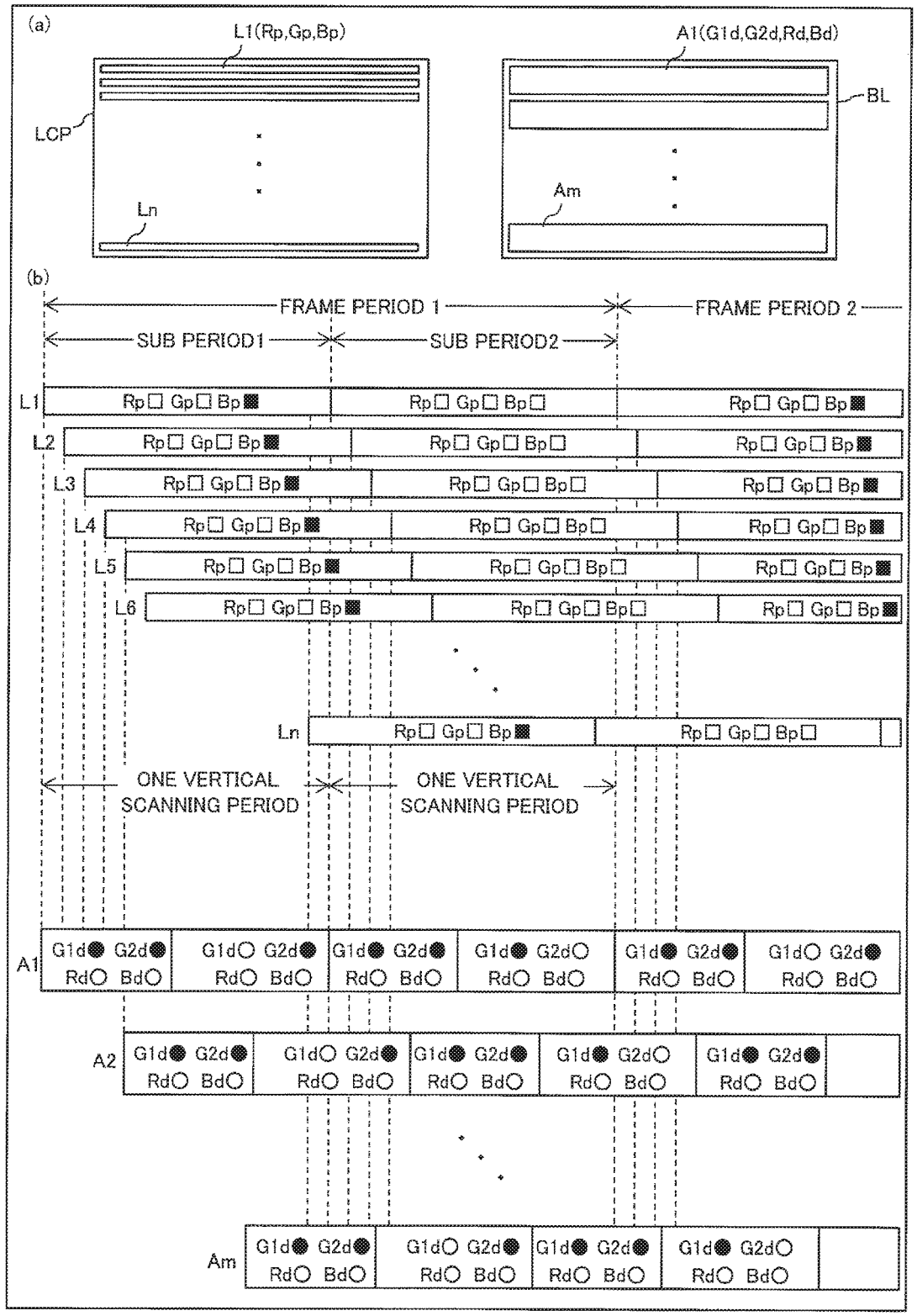
FIG. 23(a) is a block diagram illustrating a modified example of the liquid-crystal display device of Example 1 and (b) is a timing chart illustrating operations of the liquid-crystal display device in this modified example.
Figure 24:
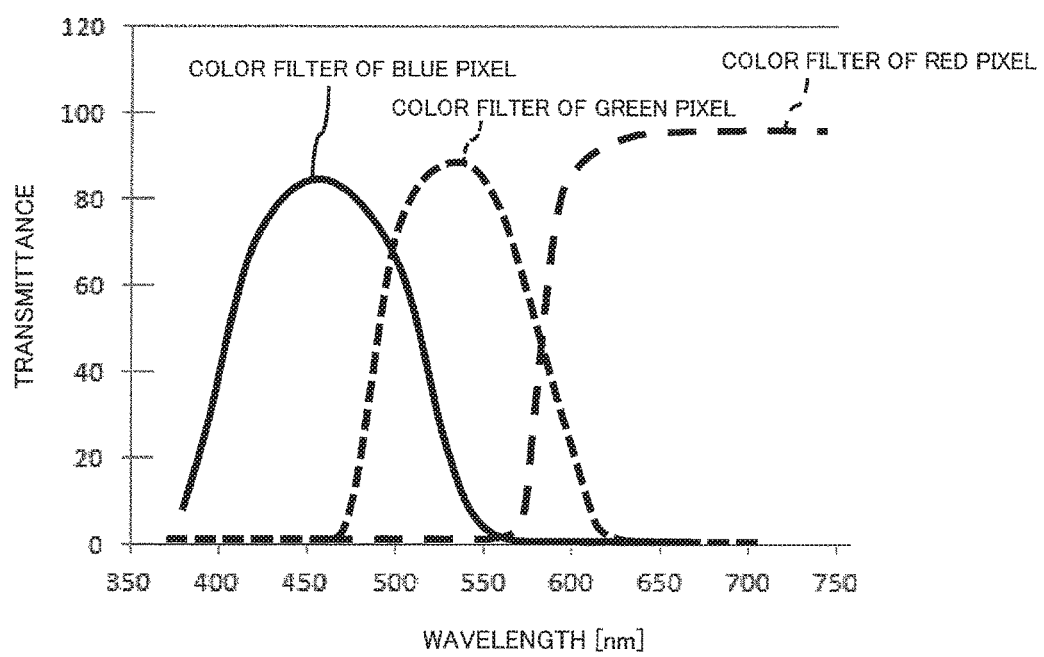
FIG. 24 is a graph indicating transmittances of color filters of respective colors.
Figure 25:
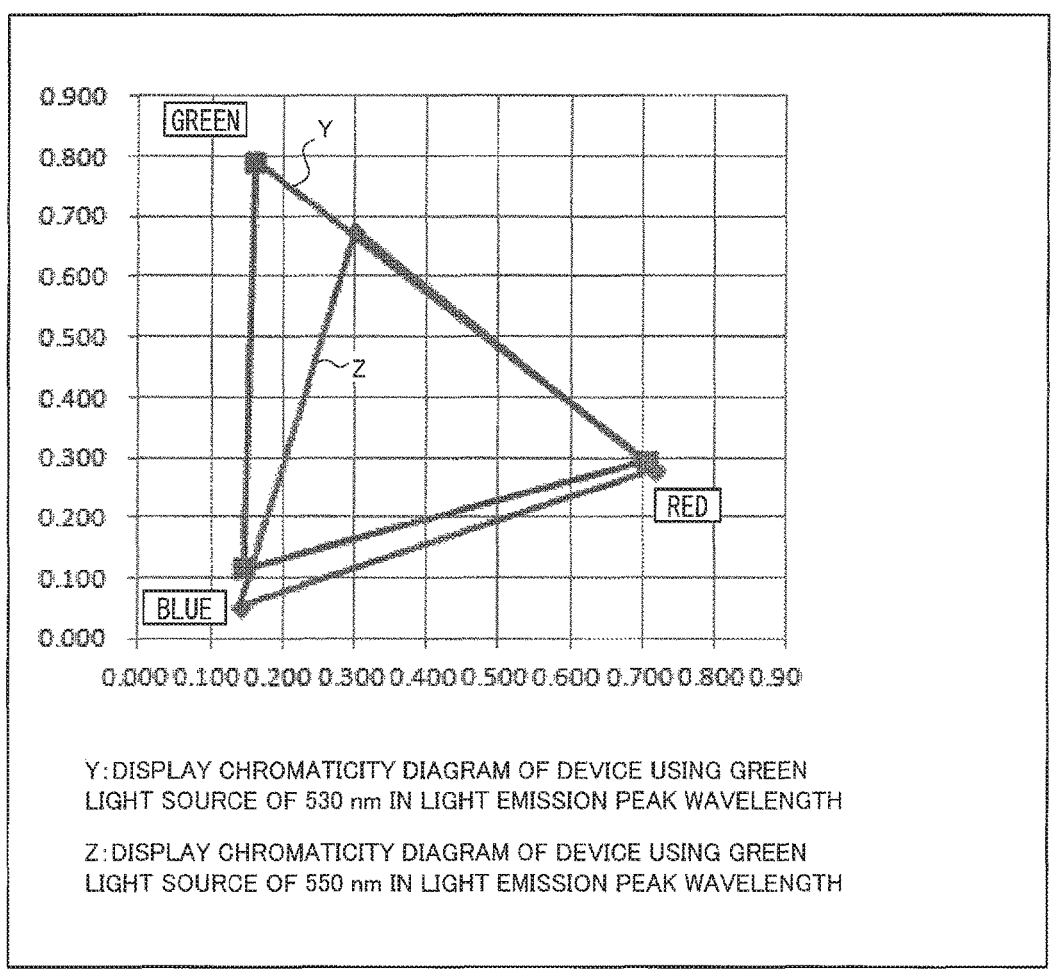
FIG. 25 is a display chromaticity diagram of a conventional liquid-crystal display device.

Here, when a turn-off period is additionally set in the sub period, it is desirable to set a turn-off period of the first light source G1d at the beginning or the end of the sub period 1 or at both of them (refer to FIG. 23) or to set a turn-off period of the second light source G2d at the beginning or the end of the sub period 2 or at both of them. Thereby, crosstalk is reduced to some extent so that further improvement in color purities is able to be achieved.

These things are able to be applied to other Examples. That is, it is naturally assumed in the present embodiment to appropriately change a state of each light source in a sub period in a range where improvement in color reproducibility (improvement in color purities) is found (the object thereof is not limited).

SUMMARY

The present liquid-crystal display device is a liquid-crystal display device which includes a red pixel including a red color filter, a green pixel including a green color filter, a blue pixel including a blue color filter, and a light radiation unit for radiating light to each of the pixels, the light radiation unit having first and second light sources each having a light emission peak wavelength in a green region and a third light source having a light emission peak wavelength in a blue region, in which the light emission peak wavelength of the second light source is greater than the light emission peak wavelength of the first light source, first and second terms are provided, and the first light source emits light and a liquid-crystal layer of the blue pixel is controlled to have a low transmittance equal to or less than a threshold regardless of frame data in the first term, and the first light source substantially does not emit light, the second and third light sources emit light, and the liquid-crystal layer of the blue pixel is controlled to have a transmittance according to frame data in the second term.

In the present liquid-crystal display device, it may be configured so that the light emission peak wavelength of the first light source is 530 nm or less and the light emission peak wavelength of the second light source is 550 nm or less.

In the present liquid-crystal display device, it may be configured so that each of the pixels is updated a plurality of times in one frame period and the one frame period includes the first and second terms.

In the present liquid-crystal display device, it may be configured so that a quantum dot is used for the second light source.

In the present liquid-crystal display device, it may be configured so that a light emission diode is used for the first light source.

In the present liquid-crystal display device, it may be configured so that a fourth light source having a light emission peak wavelength in a red region is included, and the fourth light source emits light and the red pixel and the green pixel are controlled to have transmittances according to frame data in each of the first and second terms.

In the present liquid-crystal display device, it may be configured so that the red pixel is controlled to have a low transmittance equal to or less than a threshold regardless of frame data in the first term and the red pixel is controlled to have a transmittance according to frame data in the second term.

In the present liquid-crystal display device, it may be configured so that a fourth light source having a light emission peak wavelength in a red region is included and the third and fourth light sources substantially do not emit light in the first term and the third and fourth light sources emit light in the second term.

In the present liquid-crystal display device, it may be configured so that a fluorescent film excited by blue light is used for at least one of the second light source and the fourth light source.

In the present liquid-crystal display device, it may be configured so that a period in which at least one of the first and second light sources, and the third and fourth light sources emit light and the red pixel, the green pixel, and the blue pixel are controlled to have transmittances according to frame data is able to be provided.

In the present liquid-crystal display device, it may be configured so that a period in which all of the first to third light sources do not emit light is provided.

A method for controlling the present liquid-crystal display device is a method for controlling a liquid-crystal display device which includes a red pixel including a red color filter, a green pixel including a green color filter, a blue pixel including a blue color filter, and a light radiation unit for radiating light to each of the pixels, the light radiation unit having first and second light sources each having a light emission peak wavelength in a green region and a third light source having a light emission peak wavelength in a blue region, in which the light emission peak wavelength of the second light source is greater than the light emission peak wavelength of the first light source, first and second terms are provided, and the first light source emits light and a liquid-crystal layer of the blue pixel is controlled to have a low transmittance equal to or less than a threshold regardless of frame data in the first term, and the first light source substantially does not emit light, the second and third light sources emit light, and the liquid-crystal layer of the blue pixel is controlled to have a transmittance according to frame data in the second term.

The invention is not limited to the aforementioned embodiment, but also encompasses embodiments achieved by appropriately modifying the aforementioned embodiment based on common general technical knowledge and embodiments achieved by combining such embodiments.

INDUSTRIAL APPLICABILITY

The present liquid-crystal display device is suitably used in, for example, a large-sized liquid-crystal television, a liquid-crystal monitor, a television monitor, and the like.

REFERENCE SIGNS LIST

LCD liquid-crystal display device
LCP liquid-crystal panel
Rp, Gp, Bp red pixel, green pixel, blue pixel
BL backlight
L1, Ln pixel line
A1, Am divisional illumination area (of backlight)
x, y sub period
G1$d$, G1E first light source (green, short wavelength side)
G2$d$, G2E second light source (green, long wavelength side)
B$d$, BE third light source (blue)
R$d$, RE fourth light source (red)

The invention claimed is:

1. A liquid-crystal display device which comprises a red pixel including a red color filter, a green pixel including a green color filter, a blue pixel including a blue color filter, and a light radiation unit for radiating light to each of the pixels, the light radiation unit having first and second light sources each having a light emission peak wavelength in a green region and a third light source having a light emission peak wavelength in a blue region, wherein
   the light emission peak wavelength of the second light source is greater than the light emission peak wavelength of the first light source, first and second terms are provided, and
   the first light source emits light and a liquid-crystal layer of the blue pixel is controlled to have a low transmittance equal to or less than a threshold regardless of frame data in the first term, and the first light source substantially does not emit light, the second and third light sources emit light, and the liquid-crystal layer of the blue pixel is controlled to have a transmittance according to frame data in the second term.

2. The liquid-crystal display device according to claim 1, wherein the light emission peak wavelength of the first light source is 530 nm or less and the light emission peak wavelength of the second light source is 550 nm or less.

3. The liquid-crystal display device according to claim 1, wherein each of the pixels is updated a plurality of times in one frame period and the one frame period includes the first and second terms.

4. The liquid-crystal display device according to claim 1, wherein a quantum dot is used for the second light source.

5. The liquid-crystal display device according to claim 1, wherein a light emission diode is used for the first light source.

6. The liquid-crystal display device according to claim 1, comprising
a fourth light source having a light emission peak wavelength in a red region, wherein
the fourth light source emits light and the red pixel and the green pixel are controlled to have transmittances according to frame data in each of the first and second terms.

7. The liquid-crystal display device according to claim 6, wherein a fluorescent film excited by blue light is used for at least one of the second light source and the fourth light source.

8. The liquid-crystal display device according to claim 1, wherein
the red pixel is controlled to have a low transmittance equal to or less than a threshold regardless of frame data in the first term and the red pixel is controlled to have a transmittance according to frame data in the second term.

9. The liquid-crystal display device according to claim 8, comprising
a fourth light source having a light emission peak wavelength in a red region, wherein
the third and fourth light sources substantially do not emit light in the first term and the third and fourth light sources emit light in the second term.

10. The liquid-crystal display device according to claim 9, wherein a fluorescent film excited by blue light is used for at least one of the second light source and the fourth light source.

11. The liquid-crystal display device according to claim 1, wherein
a period in which at least one of the first and second light sources, and the third and fourth light sources emit light and the red pixel, the green pixel, and the blue pixel are controlled to have transmittances according to frame data is able to be provided.

12. The liquid-crystal display device according to claim 1, wherein a period in which all of the first to third light sources do not emit light is provided.

13. A method for controlling a liquid-crystal display device which comprises a red pixel including a red color filter, a green pixel including a green color filter, a blue pixel including a blue color filter, and a light radiation unit for radiating light to each of the pixels, the light radiation unit having first and second light sources each having a light emission peak wavelength in a green region and a third light source having a light emission peak wavelength in a blue region, wherein
the light emission peak wavelength of the second light source is greater than the light emission peak wavelength of the first light source, first and second terms are provided, and
the first light source emits light and a liquid-crystal layer of the blue pixel is controlled to have a low transmittance equal to or less than a threshold regardless of frame data in the first term, and the first light source substantially does not emit light, the second and third light sources emit light, and the liquid-crystal layer of the blue pixel is controlled to have a transmittance according to frame data in the second term.

* * * * *